US007904069B2

(12) United States Patent
Rye et al.

(10) Patent No.: US 7,904,069 B2
(45) Date of Patent: Mar. 8, 2011

(54) ICON MOBILE PHONE REMOTE WITH FAVORITE CHANNEL SELECTION

(75) Inventors: David J. Rye, Kent, WA (US); Leslie A. Leech, Kowloon (HK); James R. Phillips, Bellevue, WA (US); George E. Stevenson, Koowloon (HK)

(73) Assignee: X10 Ltd., Hunghom, Kowloon (HK)

(*) Notice: Subject to any disclaimer, the term of this patent is extended or adjusted under 35 U.S.C. 154(b) by 845 days.

(21) Appl. No.: 11/615,881

(22) Filed: Dec. 22, 2006

(65) Prior Publication Data

US 2008/0003993 A1 Jan. 3, 2008

Related U.S. Application Data

(63) Continuation-in-part of application No. 11/552,924, filed on Oct. 25, 2006.

(60) Provisional application No. 60/806,254, filed on Jun. 29, 2006.

(51) Int. Cl.
*H04M 3/00* (2006.01)

(52) U.S. Cl. ...................... 455/418; 455/556.1; 455/419; 455/420; 455/566

(58) Field of Classification Search ............... 455/556.1, 455/419, 420; 340/5.31, 5.6; 709/217
See application file for complete search history.

(56) References Cited

U.S. PATENT DOCUMENTS

| | | | |
|---|---|---|---|
| 5,410,326 | A | 4/1995 | Goldstein |
| 5,414,426 | A | 5/1995 | O'Donnell et al. |
| D365,100 | S | 12/1995 | Farinelli et al. |
| D436,098 | S | 1/2001 | Hormann |
| 6,252,634 | B1 | 6/2001 | Yuen et al. |
| 6,445,306 | B1 | 9/2002 | Trovato et al. |
| D480,697 | S | 10/2003 | Lee et al. |
| D508,035 | S | 8/2005 | Kim et al. |
| 6,985,069 | B2 | 1/2006 | Marmaropoulos |
| 6,998,997 | B2 | 2/2006 | Stevenson et al. |
| D546,320 | S | 7/2007 | Choi |
| 7,254,777 | B2 | 8/2007 | Hayes et al. |
| 7,320,024 | B2 * | 1/2008 | Oku .............................. 709/217 |
| 2002/0067283 | A1 | 6/2002 | Marmaropoulos |
| 2002/0180582 | A1 * | 12/2002 | Nielsen .......................... 340/5.6 |
| 2003/0048295 | A1 | 3/2003 | Lilleness et al. |

(Continued)

FOREIGN PATENT DOCUMENTS

WO 03007584 1/2003

(Continued)

OTHER PUBLICATIONS

"Harmony 890 Advanced Universal Remote", Logitech, www.logitech.com, pp. 1-2, 2007.

(Continued)

*Primary Examiner* — David Q Nguyen
(74) *Attorney, Agent, or Firm* — Black Lowe & Graham, PLLC

(57) ABSTRACT

The present invention provides a mobile phone remote control system, a system for programming the remote control, and methods of programming or using the remote control. The mobile phone remote control system is configured to be selectively set up or programmed using a display screen and corresponding function buttons on the remote control. The remote control system may be used to control the channel of a media device such as a television based on an icon displayed on a screen of the mobile phone. The set up process allows channel numbers to be automatically assigned based on icons selected by a user and previously identified geographic information such as a mobile phone user address postal zip code.

35 Claims, 20 Drawing Sheets

U.S. PATENT DOCUMENTS

| | | | | |
|---|---|---|---|---|
| 2003/0070168 | A1 * | 4/2003 | Stone | 725/37 |
| 2003/0151538 | A1 | 8/2003 | Escobosa et al. | |
| 2003/0159146 | A1 | 8/2003 | Kim | |
| 2003/0193519 | A1 * | 10/2003 | Hayes et al. | 345/721 |
| 2004/0031058 | A1 * | 2/2004 | Reisman | 725/112 |
| 2004/0051625 | A1 * | 3/2004 | Nass et al. | 340/5.31 |
| 2004/0249925 | A1 * | 12/2004 | Jeon et al. | 709/223 |
| 2005/0055472 | A1 * | 3/2005 | Krzyzanowski et al. | 710/5 |
| 2006/0053447 | A1 | 3/2006 | Krzyzanowski et al. | |
| 2006/0101498 | A1 | 5/2006 | Arling et al. | |
| 2007/0142082 | A1 * | 6/2007 | DaCosta | 455/556.1 |
| 2008/0302582 | A1 | 12/2008 | Sekhri et al. | |

FOREIGN PATENT DOCUMENTS

| | | |
|---|---|---|
| WO | 03045022 | 5/2003 |

OTHER PUBLICATIONS

"Universal Remotes", Logitech, www.logitech.com, pp. 1-2, 2007.

* cited by examiner

ICON MOBILE PHONE REMOTE WITH FAVORITE CHANNEL SELECTION

PRIORITY CLAIM

This application is a continuation-in-part of U.S. patent application Ser. No. 11/552,924, filed on Oct. 25, 2006, which claims priority to U.S. Provisional Application Ser. No. 60/806,254 filed Jun. 29, 2006, contents of each is hereby incorporated by reference.

FIELD OF THE INVENTION

This invention relates generally to a programmable remote control including a programmable mobile phone remote control system with selective setup features.

BACKGROUND OF THE INVENTION

One of the pervasive features of consumer audio and video electronic components in recent years has been and continues to be the handheld remote control. The handheld remote control sends control signals to the controlled media device, generally using either infrared or radio frequency signals. The remote control signal may alter any of a variety of aspects of the electronic device being controlled, such as its volume, channel, power, or various performance settings such as color, contrast, tint, or others.

Most conventional television remotes typically have a plurality of buttons with preassigned functions. For example, remotes commonly have a number pad with a button assigned to each number 0 through 9. They also generally include buttons to increase or decrease the current channel number, increase or decrease the volume setting, and to invoke a menu-driven on-screen selection for adjusting picture attributes such as color, contrast, or tint. These standard remotes offer little functionality and require users to independently memorize various settings and channels.

In some cases, remotes include keys that can be programmed. One method for inputting, downloading, or otherwise programming the desired functions of the remote control includes entering such commands directly on the remote control as taught by U.S. Pat. No. 5,414,426. Most such remote controls can only store commands if those commands are present in a code library contained within the remote control.

Consequently, there is need for an improved programmable remote control that provides better features than found in the prior art remotes.

SUMMARY OF THE INVENTION

The present invention is an improved remote control, preferably including a remote control that can control a television. Alternate examples of the invention include a system for programming the remote control and various methods of programming and using the remote control. In one example, the remote control is configured to be selectively set up or programmed, which allows a user to set up only the specific remote control features of interest. The remote control may include a module that may be accessed directly by the remote control or via a computer to guide the user through the set up process. If this feature is included and used by the user, it enables the user to avoid setting up undesired features, thereby saving the user time by not answering many questions and options that would otherwise be necessary if a full set up were required.

In one example of the invention, a remote control includes a memory, a microprocessor, and a display screen sized to display a plurality of icons. Depending on the tailored implementation by the user, one or more of the icons corresponds to a channel of a media device such as a television. Buttons may be included to enable selection of any of the plurality of icons when the remote control is in a select-channel mode. In one example, the selection of the at least one of the plurality of icons activates an assigned function stored by the memory device in the remote control. The remote further includes a transmitter arranged in the remote control to transmit a wireless signal from the remote control toward a media device. The remote may include an infrared transmitter, a radio frequency transmitter, or both.

In another example of the invention, a system includes a remote control having a display screen that is generally similar (but not necessarily identical) to the exemplary remote discussed above. In addition, a computer is programmed such that it is in communication with the remote, either wired or wirelessly, as desired. The communication link enables the personal computer to send a variety of signals to the remote, for example including updates for channel or other icons to be displayed on the screen or for channel assignments correlating channel icons with particular television channels.

In another example of the invention, the remote is in communication with a computer to receive signals not necessarily related to the control of the television or other remotely controlled device. For example, many security devices are configured for communication with a home computer. In turn, the home computer is programmed to send an appropriate signal to the remote, causing the remote to display an applicable message or iconic representation on the screen representative of a condition in the security device.

In yet another example of the invention, a mobile phone is used as the remote. In some forms of this example, the mobile phone screen depicts icons such as those described above. The mobile phone stores universal IR control codes (or other control codes) and sends such codes wirelessly to a television or other electronic device being controlled. The wireless instructions may be sent in a variety of forms, including for example Bluetooth or other formats, and optionally via an additional IR transceiver in communication between the phone and electronic device.

BRIEF DESCRIPTION OF THE DRAWINGS

The sizes and relative positions of elements in the drawings or images may not necessarily be to scale. For example, some elements may be arbitrarily enlarged or otherwise modified to improve clarity. Further, the illustrated shapes of the elements may not convey their actual shapes, and have been solely selected for ease of recognition. Various embodiments are briefly described with reference to the following drawings.

DETAILED DESCRIPTION OF THE INVENTION

Figure 1:
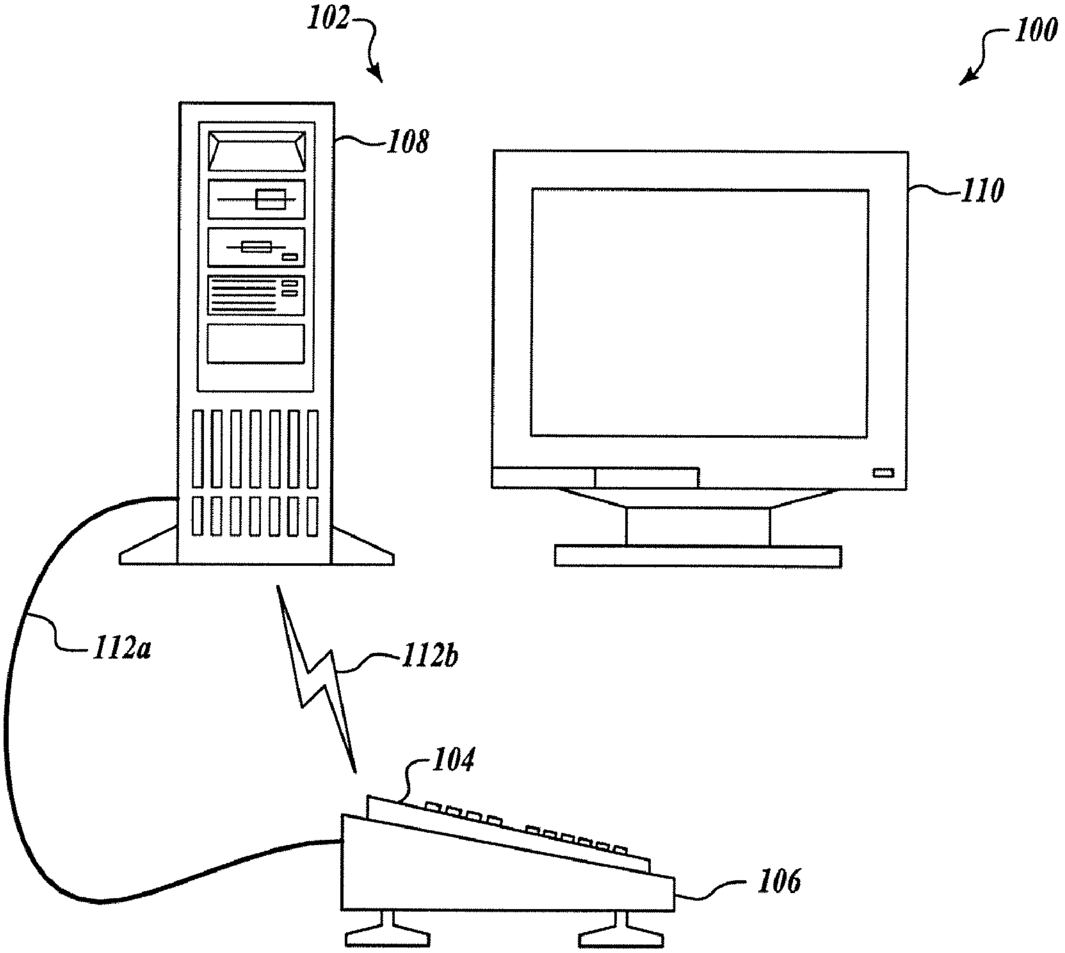
FIG. 1 is a schematic view of a system comprising a computer in communication with a remote control according to one illustrated embodiment.

One preferred example of the invention takes the form of a remote control having a display screen configured to display a number of menu items. For example, the screen may be able to display icons that represent particular channels of a media device, such as the channels of a television as provided by a particular cable television provider within a specific geographic region. The display screen may be configured to present color versions of the icons, where the icons are logos that identify a particular network channel, such as a television (local or other), cable, satellite, radio, or other media device channel. In this example, a user is able to change the channel on the television by selecting an icon that is visible or at least accessible on the display screen (i.e., scroll up, down, left, right on the screen to access additional icons). The user may select the icon by touching it on the screen or by pressing an associated button adjacent to the screen rather than one of the conventional methods of selecting a channel which may include selecting and then scrolling through a channel guide displayed on the television screen or memorizing favorite channels and entering numbers on a keypad to switch between or go to those favorite channels. As many remote control users appreciate, if the channel numbers are not entered quickly then the desired channel is not selected.

In one embodiment of the invention, the remote control is programmable by direct interaction, which is accomplished using the display screen, using a keypad, using function keys or buttons, or some combination of the above. In one example, the remote control is preprogrammed with a collection of icons representative of network channels. The icons may be associated with particular television channels or, alternatively, may be unassigned. The icons may be in various forms such as text, image, or a combination of both. In addition, the icons may represent trademarked logos for particular media distributors (e.g., ABC®, CNN®, HBO®, ESPN®, etc.). The following group of channel icons or logos, which may be available in the United States, is shown for illustrative purposes and is not meant to be an all-inclusive listing:

The association of an icon with a particular television channel number may depend on a specific geographical region where the television is located, a particular service provider, or both. A single channel, for example the American Broadcast Company, ABC®, may be associated with different channel numbers in different regions of the United States because one provider on the West Coast may assign channel "4" to ABC while a different provider on the East Coast assigns channel "7" to ABC. Accordingly, the remote control may be purchased with a pre-assigned, stored icon/number database for a geographic region specified by a user upon ordering the remote control or the remote control may be programmed by the user after purchase. In one embodiment, the association of the icons with the channels numbers in accordance with a particular geographic region includes entering a postal zip code into the remote control.

In addition to assigning all or any subset of the available icons to particular media device channels, the remote control may be configured to operate a variety of media devices. Various methods of configuring the remote control for desired media devices and favorite media device channels are discussed in greater detail below. In addition, any of the keys or icons may be programmed to carry out a variety of commands. One example of storing and executing macro commands via a remote control is described in U.S. Pat. No. 6,998,997, which is incorporated by reference. In one example of the present invention, the remote control includes the ability to store and execute macro commands as described in the '997 patent, with one or more macro commands being triggered by touching an icon displayed on the display screen or pressing an option button located adjacent to the screen.

In one embodiment, the remote control is programmable using a wired or wireless data communications link between the remote control and a computer. The computer includes software that permits the user to customize features of the remote control and then download or transmit those features to the remote control. The remote control is selectively programmable, which means the user can choose to program or set up certain aspects of the remote control while skipping over other setup menus or leaving certain aspects of the remote control in a default or in a non-programmed configuration.

FIG. 1 shows a system 100 comprising a computer 102, a remote control 104, and a docking station 106, according to one illustrated embodiment of the present invention. The computer 102 includes a central processing unit (CPU) 108 with a memory, a monitor 110, and may include a number of user interface devices (not shown) such as keyboard, mouse, joystick or other devices to provide for local user interaction with the computer 102. Local user interaction may include, but is not limited to, configuring the system, loading and monitoring media content, downloading data to the computer 102 or to the remote control 104, adjusting operational parameters, and performing other functions.

In one embodiment of the invention, the computer 102 is employed to set up or program the remote control 104. For example, icons corresponding to channels potentially available on a user's television are downloaded onto the computer 102 over a network, such as the Internet. These downloaded icons are then transferred to the remote control 104 via the connection between the computer 102 and the docking station 106. The network connection with the computer 102 allows for further updating information stored in the remote control 104, which may include, but is not limited to, downloading new icons, revising existing, stored icons, reconfiguring the remote control 104 for use in a different geographic region, adding to or revising a database of media device codes stored in the remote control, etc.

While these actions may be performed using the computer 102, the invention also provides that these actions can be accomplished without the computer 102. As will be described in greater detail below, the process of setting up or programming the remote control 104 may be done directly through various input/output (I/O) interfaces arranged on the remote control 104 and which may also include selecting menu items visually displayed on the remote control 104. In one embodiment, the process of setting up or programming the remote control 104 is accomplished with a cellular telephone (not shown) in a manner that is similar to downloading a ringtone or a digital photo.

The docking station 106 is preferably coupled to the computer by a wired connection 112*a*. Additionally or alternatively, the communication between the computer 102 and remote 104 may be a wireless connection 112*b*, and may not require the docking station 106. By way of example, a wireless connection 112*b* can be via BLUETOOTH®, radio frequency (RF), infrared (IR), or other means. The wired connection 112*a* may be via a serial, USB, FIREWIRE®, or other cable received in appropriate ports (not shown) of the computer 102 and the docking station 106. The docking station 106 preferably includes a power connection to the remote 104 so that rechargeable batteries in the remote control 104 may be recharged when the remote 102 is electrically coupled with the docking station 106. Optionally, the remote 104 may connect directly to the computer 102 via the wired connection 112*a* or the wireless connection 112*b* to modify remote settings.

Figure 2:
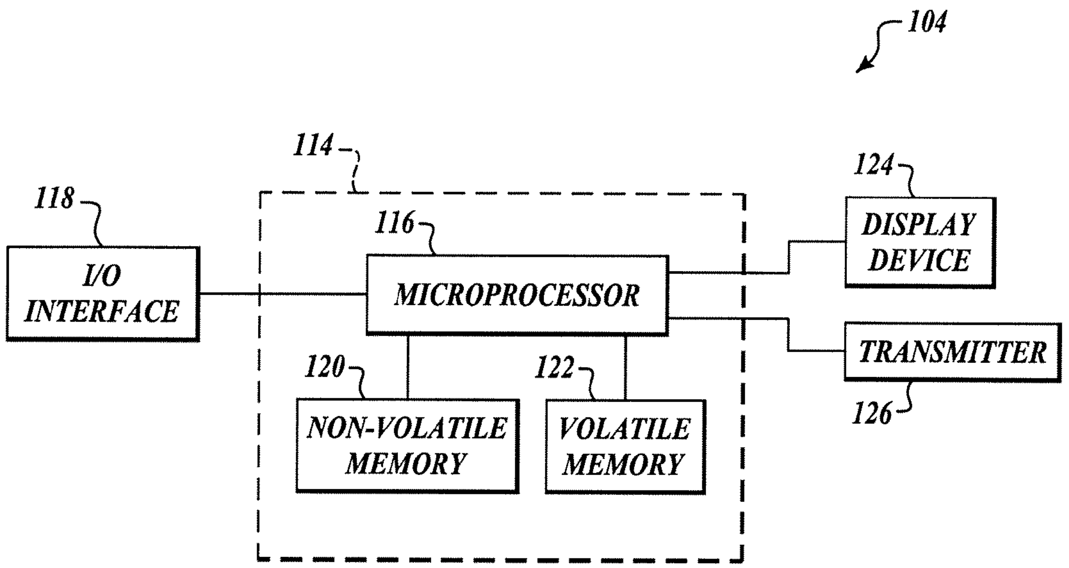
FIG. 2 is a system diagram of the remote control of FIG. 1.

FIG. 2 shows the remote control 104 having a microprocessor 116 coupled to receive input from an I/O interface 118, which may be a keyboard, a touch screen, or some other mechanism for triggering action by the microprocessor 116. In one embodiment, a combined processor and memory 114 further includes a first memory 120, which is a nonvolatile memory that preferably stores operating system instructions for the microprocessor 116, and may take the form of memory devices such as read-only memory (ROM), programmable read-only memory (PROM), electrically programmable read-only memory (EPROM), or electrically erasable programmable read-only memory (EEPROM). In another embodiment, a second memory 122 is provided, which may be a volatile memory such as random access memory (RAM), for temporarily storing signals that form program or macro routines until those routines are saved in the nonvolatile memory 120. However, the program or macro routines can be permanently saved in the second memory 122.

In one embodiment, the remote control 104 includes batteries that provide electrical power to the remote control 104 further provide power to the first memory 120 or the second memory 122. A capacitor (not shown) provides backup power to the memories 120, 122 while the batteries are being changed or charged. In an alternative embodiment, an EEPROM is used in lieu of the capacitor.

The remote control 104 further includes a display device 124 and a transmitter 126. The display device 124 receives input signals under control of the microprocessor 116 and displays information to the user. The transmitter 126 receives electronic signals from the microprocessor 116. In one embodiment, the transmitter 126 is an optical transmitter that cooperates with the microprocessor 116 to perform an electro-optical conversion of the electronic signals to optical signals for transmission to a media device 128 (FIG. 3).

Figure 3:
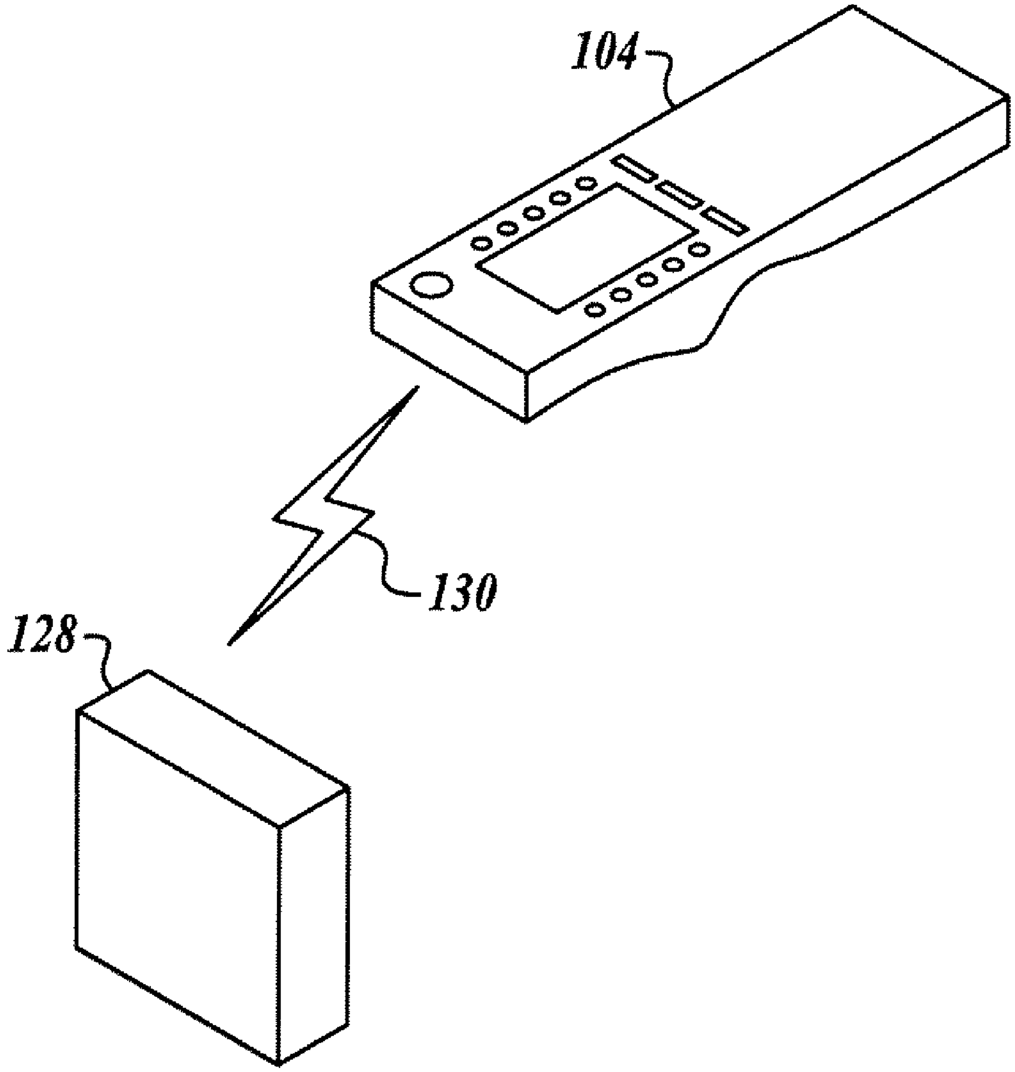
FIG. 3 is an isometric view of a remote control sending a wireless signal to a media device according to one illustrated embodiment.

FIG. 3 shows the remote control 104 in communication with the media device 128 such as a television via a wireless signal 130 according to one illustrated embodiment of the invention. The media device 128 may take the form of any of a variety of devices, such as a television (TV), a cable box, a video cassette recorder (VCR), a digital video disk (DVD) player, an audio amplifier, a radio receiver or tuner, a compact disk (CD) player or recorder, a digital video recorder (DVR), or other media devices. Hereinafter and throughout this description, the media device 128 will generally be referred to as the TV for brevity and clarity. Thus, a command to change the channel of the media device 128 using an icon displayed on the display screen of the remote control 104 comprises sending the command from the remote control the TV either directly or through another device such as a television tuner on a VCR, a cable box, a satellite box, or a set-top box.

The commands issued by the remote may be a simple instruction such as the command to change a channel. Alternatively, one command may issue multiple instructions such that the remote control 104 operates to turn on the cable box, turn on the television, select a particular channel, and set the volume to a desired level. In accordance with a preferred implementation of the invention, the remote control 104 includes programming instructions stored in at least the first memory 120 and executable by the microprocessor 116 to assign a sequence of command instructions, referred to as a macro, to a button or icon for controlling the remotely controlled media device 128. The components of a remote 104 capable of carrying out such macros are described in the aforementioned '997 patent.

Figure 4A:
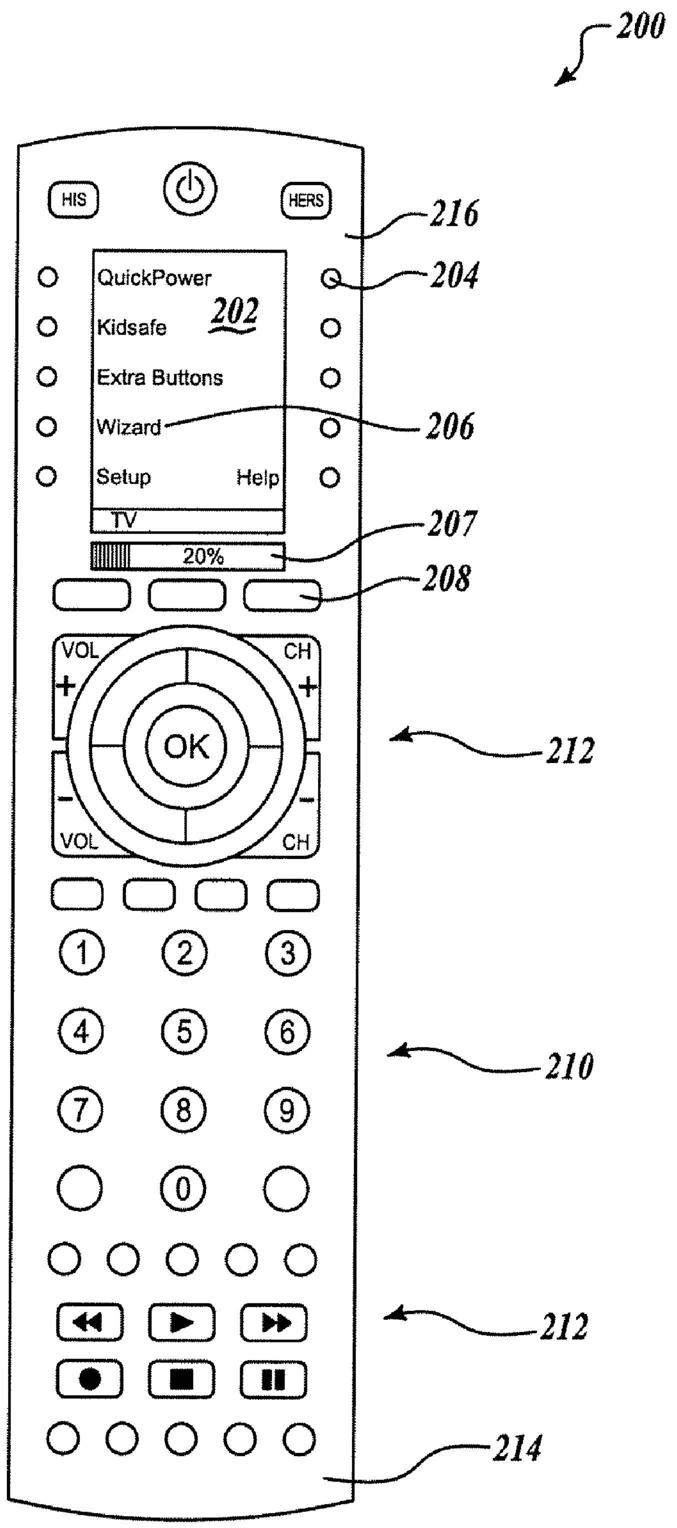
FIG. 4A is a top plan view of a remote control having a display screen showing a number of menu items according to one illustrated embodiment.

FIG. 4A shows an exemplary remote control 200 having a display screen 202, first peripheral keys or buttons 204 that correspond to menu items 206, second buttons 208, a numeric keypad 210, and other input interfaces 212 according to the illustrated embodiment. The overall layout of the remote 200 may be arranged in any number of ways, for example the display screen 202 may be placed in the middle of the remote or the numeric keypad 210 may be located directly below the second buttons 208. The other input interfaces 212 may correspond to depressible buttons, such as play, stop, fast forward, rewind, mute, channel+, channel−, volume+, and volume−. In one embodiment, an exterior surface 214 is made from a chemically etched metallic alloy permitting each button or key to be subtly illuminated. In addition, the display screen 202 may be active or lit most of the time, which may require low levels of power to be drawn from rechargeable batteries (not shown) in the remote control 200. During various operations of the remote control, a status bar 207 indicates the progress of the operation, for example receiving or transmitting data.

Figure 4B:
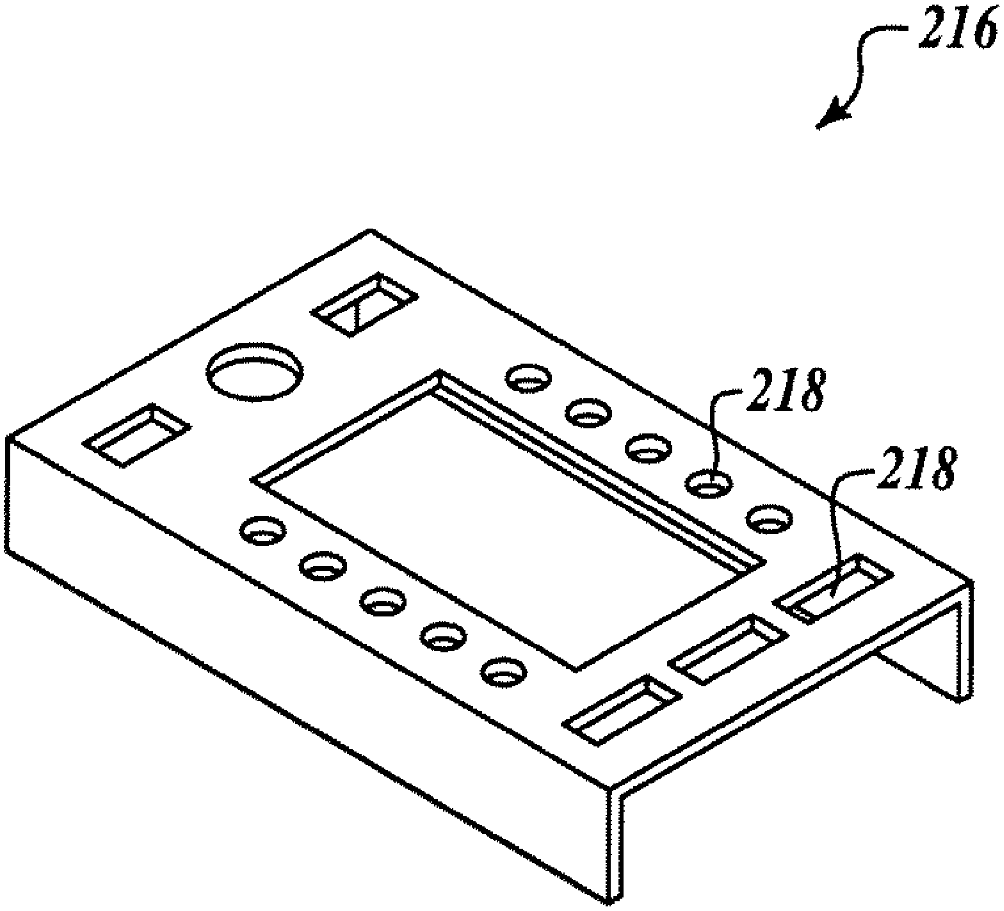
FIG. 4B is an isometric view of a removable faceplate attachable to the remote control of FIG. 4A.

FIG. 4B shows a removable faceplate 216 with openings 218 corresponding to the buttons on the remote control 200. The removable faceplate 216 may be sized to fit over a portion of the remote control 200 or over the entire front, exterior surface 214 of the remote control 200. In a preferred implementation, a pip or pin (not shown) extending from the faceplate 216 is received by a small, corresponding opening hole on the remote control 200 when the faceplate 216 is placed on the remote control 200. The pip or pin makes contact with a printed circuit board (PCB) in the remote control 200 to activate the "His" or "Hers" mode, for example. By using the pip or pin, the faceplate converts the remote to one tailored to a particular individual. Alternative methods for enabling the faceplate to tailor the device are also possible.

The display screen 202 may take various forms such as a liquid crystal display (LCD), a light emitting diode (LED) display, a thin film transistor (TFT) display, or a touch screen. In one embodiment, the display screen 202 includes a status bar indicator (not shown) to indicate downloading, uploading, or data transferring progress while the remote control 200 is being directly programmed or is in communication with the computer 102. During initial setup of the remote control 200, the display screen 202 may optionally display the icon of a vendor, such as a cable company or the store where the remote control 200 was purchased (e.g., Wal-Mart, K-Mart, Target, etc.). In addition, such a vendor icon may be displayed during initial power up after the batteries are inserted into the remote control 200.

Figure 5A:
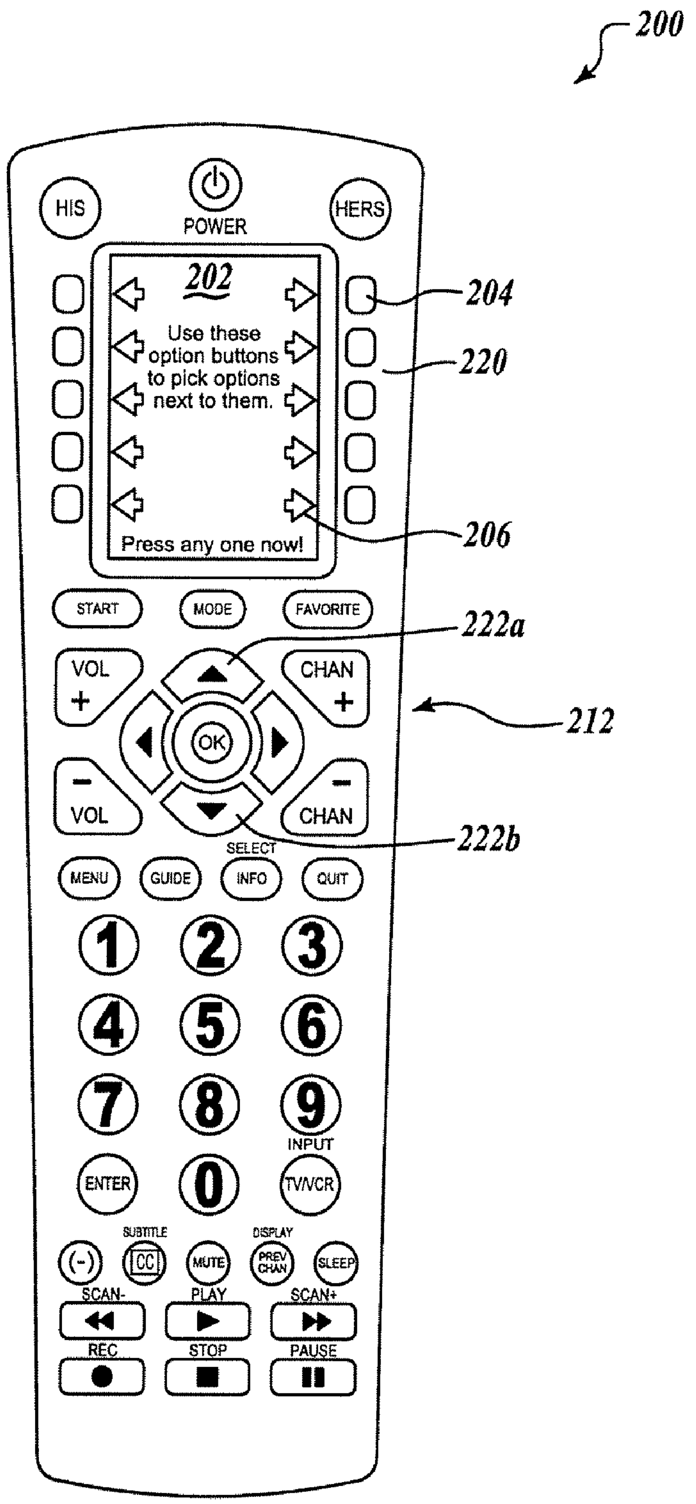
FIG. 5A is a top plan view of a remote control showing an operational association between a number of peripheral buttons and a display screen according to one illustrated embodiment.

FIG. 5A shows the peripheral buttons 204 positioned on a left/right perimeter region 220 adjacent to the display screen 202. Each button 204 corresponds to a menu item or icon 206 represented on the screen 202. The peripheral buttons 204 are used to select the associated menu item 206; various aspects, features, and functionality of the peripheral buttons 204 will be apparent in the description provided below. In the example of the invention incorporating a touch screen, the peripheral buttons 204 may optionally be omitted because the menu items 206 may be selected by touching them directly on the screen 202 rather than by pressing one of the peripheral buttons 204.

In the illustrated embodiment, the peripheral buttons 204 comprise ten user-defined buttons associated with the menu items 206. In the event the remote control 200 contains more menu items 206 than buttons 204, the remote control 200 may have a scroll mechanism, such as the up/down buttons 222*a*, 222*b* shown in the illustrated embodiment. Alternatively, the scroll mechanism may comprise a scroll wheel or other similar mechanism. The scroll mechanism 222 permits the user to scroll among menu items 206 that are not presently visible on the display screen 202. In such a case, scrolling down would cause menu items 206 to successively move up the screen 202 such that the menu items at the top of the screen would drop off and move out of view while new menu items appear at the bottom of the screen and continue to move upward as long as the scrolling instruction is maintained. Scrolling up causes the opposite movement of the menu items 206.

Figure 5B:
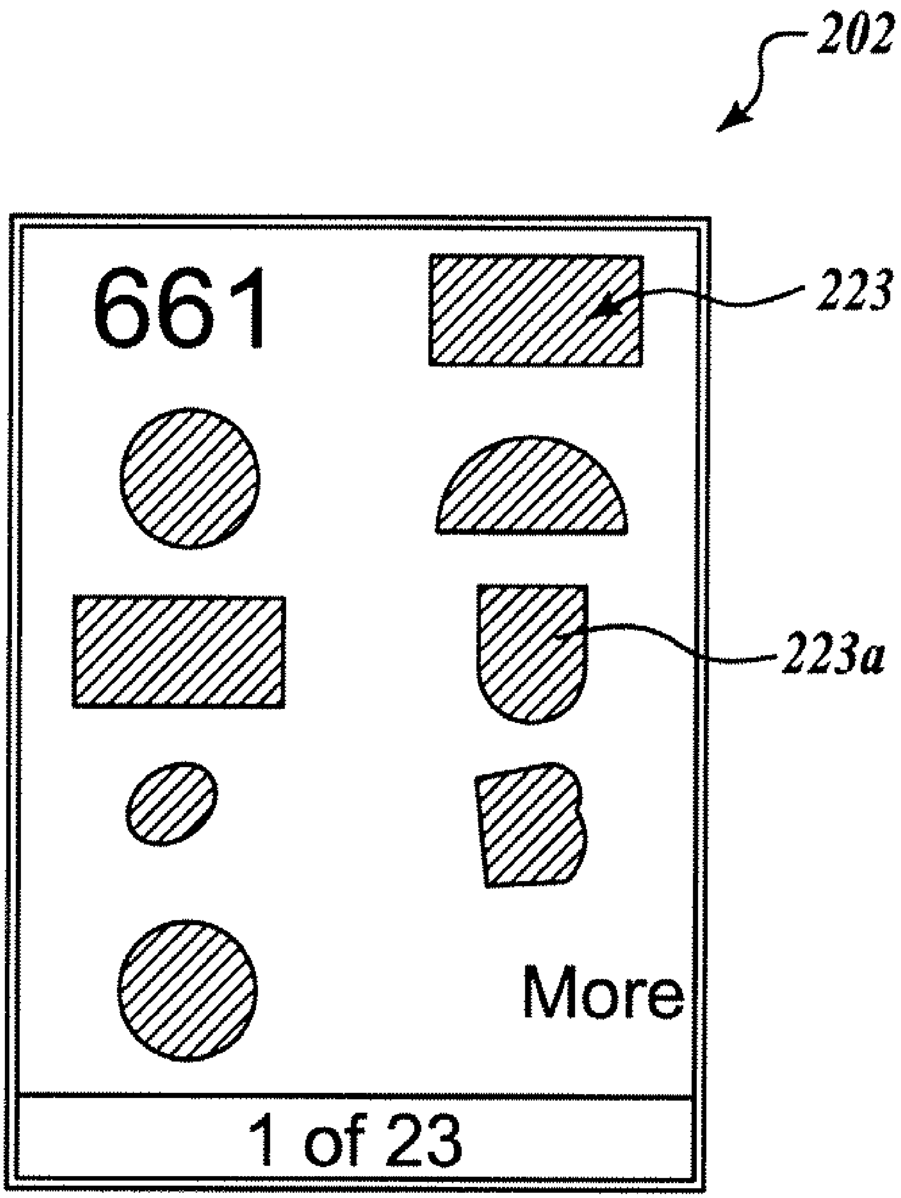
FIG. 5B is a top plan view of the display screen of the remote control of FIG. 5A showing a number of generic shapes that represent icons according to one illustrated embodiment.

As best seen in FIG. 5B, exemplary icons 223 are illustrated as generic shapes on the display screen 202. The generic shapes 223 represent actual logos and brands, which may be in various forms such as text, image, or a combination of both. By way of example, the actual logos may be trademarks of a particular media distributor (e.g., ABC®, CNN®, HBO®, FOX®, etc.). Thus, once the remote has been programmed to associate an icon with a channel, depressing the peripheral button 204 adjacent the icon will cause the channel to change to the channel associated with the icon. Programming instructions stored in the remote control's memory are associated with each icon. For icons indicative of a television channel, the memory stores data sufficient to cause the remote control to send a signal to the television to change to the channel represented by the icon. Other icons may represent aspects other than channels, and instructions stored in the memory reflect the function desired to be carried by the icons. For example, depressing the button adjacent to a first icon 223*a* will change the television channel to whatever channel is assigned to the first icon 223*a*. The same result will occur in a touch screen version by touching the icon itself. Likewise, if the remote has further macro programming assigned to the icon, touching the icon or the adjacent button causes the remote to carry out the macro instructions assigned to the icon.

In some examples of the invention, the remote control 200 is capable of downloading additional icons 223 via the computer 102. The icons 223 are then transferable to the remote control 200 and can be added as channel favorites. When personalized with the user's favorite channels (e.g., his, hers, or kids), the icons 223 will be displayed in the screen 202 next to the buttons 204. Pressing an associated button 204 will send a sequence of commands to change to that channel of the media device, for example pressing the button 204 next to an ABC® icon (not shown) changes the television channel from the present channel to ABC®. In one embodiment, the computer 102 includes a configuration utility that allows multiple users to be assigned to the remote control 200 where each user will have the ability to assign up to ten favorite buttons 204 (or more depending on memory limitations). In an alternative embodiment, a single user may assign any number of favorite channels and scroll through these favorites on the display screen 202. These features and other aspects of the remote control 200 are described in additional detail below.

The assignment of icons (or buttons) to particular channels can be made directly on the remote by following menu-driven setup instructions presented on the screen. Alternatively, as discussed above, the remote setup including channel assignments can be performed on a home computer and then transferred to the remote. If the computer 102 includes an Internet connection, software accompanying the remote and operable by the computer may access a remote server containing a database of icons and channel associations. By accessing the remote server, a user can download the channel associations for the user's area (or that have been assigned by the user's television service provider). In one example, the software operating on the computer requests user information such as the user's zip code or phone number, then accesses the remote server to determine the appropriate channels associated with the desired icons for the entered zip code or phone number. The channel associations are then downloaded to the personal computer and transferred to the remote. In a similar fashion, the remote server may store sets of macro commands that can be downloaded and transferred to the remote control.

Figure 6A:
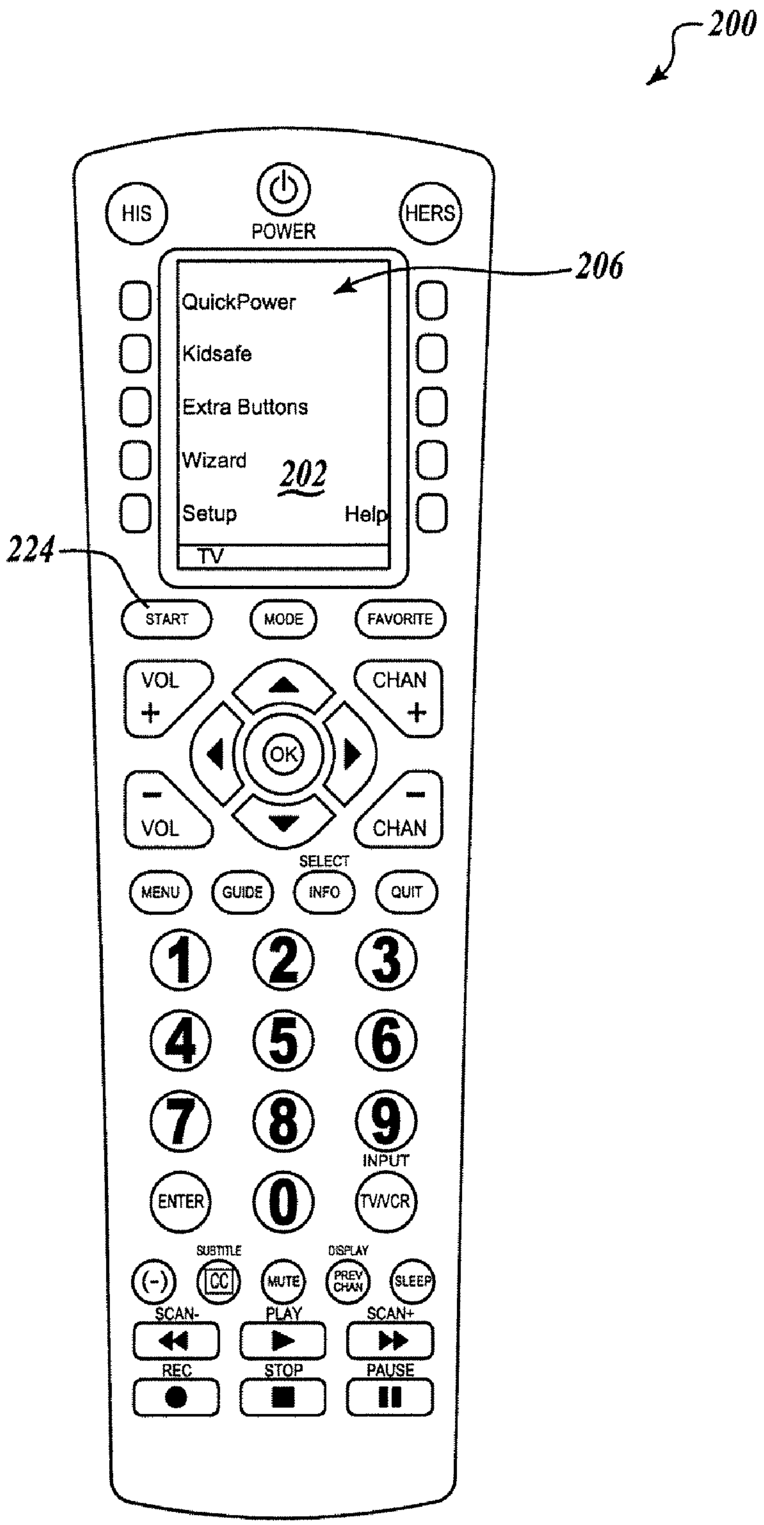
FIG. 6A is top plan view of a remote control having various menu items for setting up the remote control displayed on a display screen.

FIG. 6A shows one exemplary embodiment of the display screen 202 of the remote control 200 having a number of menu items 206 that may be used to program or operate the remote control 200. In one embodiment, these menu items 206 are presented on the display screen 202 when the "START" button 224 is depressed. Generally, the menu items 206 permit different features or aspects of the remote control 200 to be accessed. By way of example, the remote control 200 is programmable or operable to control selected devices, provide quick access to a group of favorite media device channels, and limit or restrict use of the remote control 200 when the remote control 200 is being used by a particular user, such as a child. In addition, the remote control 200 may communicate and operate with a home security system, with a computer, or another remote control, which may include the remote control 200 transferring data to/from the other remote control.

Figure 6B:
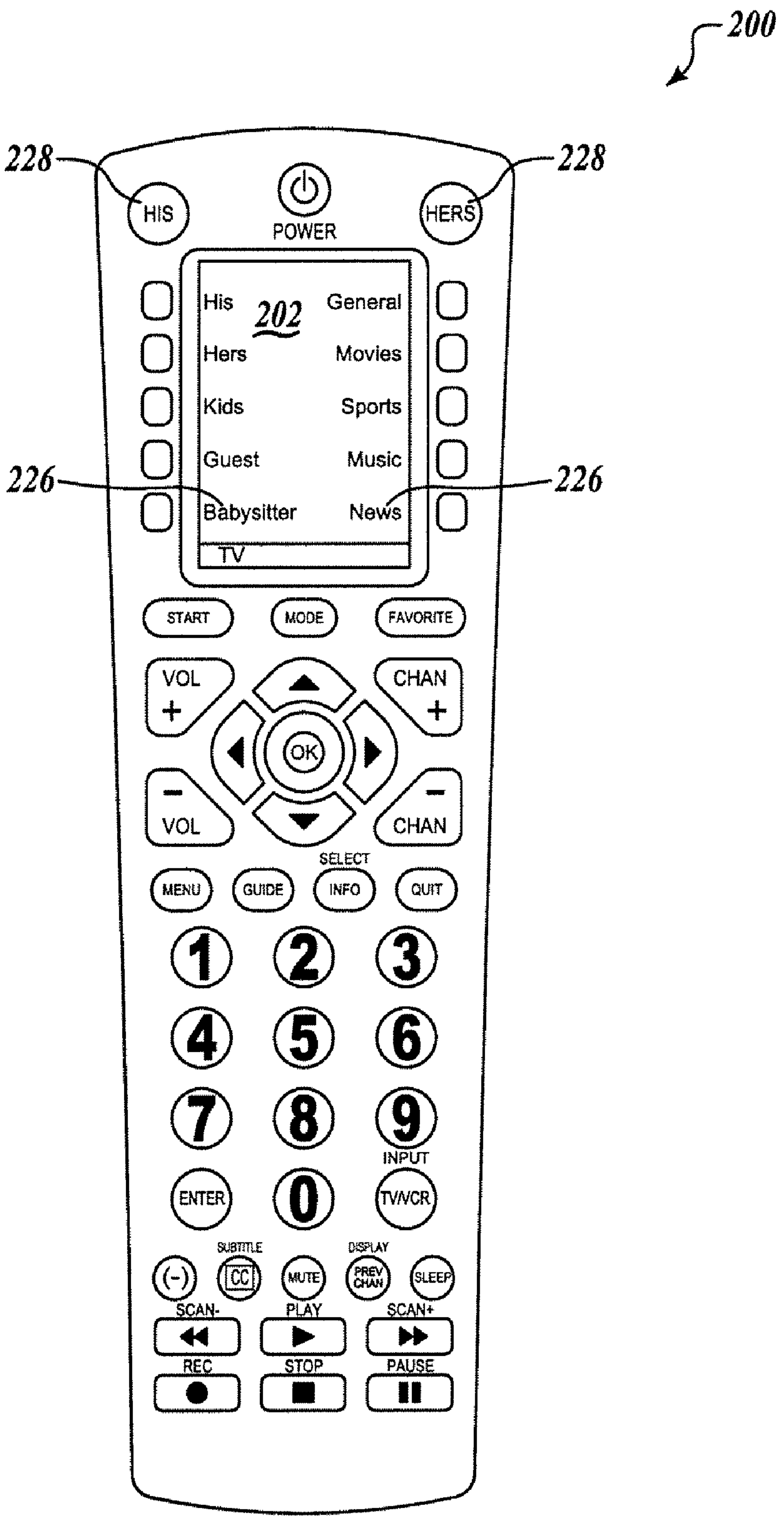
FIG. 6B is the remote control of FIG. 6A showing a number of users, user groups, or topical groups containing customized icon/channel pairings.

FIG. 6B shows one example of the remote control 200 personalized for multiple users (e.g., his, hers, child, babysitter, etc.) or customized for a particular category of channels (e.g., news, sports, movies, music, etc.). In this example, various users, user groups, or category or topical groups 226 may each be assigned a number of favorite channels. Setting up the remote control 200 to have desired, favorite channels is described in greater detail below.

Any number of users may share a common remote control in this fashion, using a scrolling function to scroll the listed users or user groups 226 up and down as necessary until a desired user or group is found. By pressing the button (or touching the screen) associated with a user or group 226, programming within the remote control causes the favorite channels (i.e., icons, logos, or alphanumeric characters) associated with that user or group 226 to be displayed on the display screen 202. Likewise, the memory stores data files associated with each user group or category, defining the stored icons and channels or actions desired to be contained in that group. For example, one user may favor all sports channels and tailors the remote control to place those icons prominently at the top of the display. Another user may prefer movie channels and may tailor the remote to place those channel icons at the top of the display. By selecting the appropriate group 226, the display is quickly tailored to the preferences of the user.

In the illustrated embodiment, the remote control 200 includes buttons 228, identified as a "His" and a "Hers" buttons for example, that allows the remote control 200 to be quickly reconfigured for either him or her. This "his and her" example is an alternate form of the personalization described above and is ideally suited, for example, for use by a couple. In this form, pressing the "Her" button 228 on the remote control will set the remote control to display her favorite channels on the display screen 202.

The programming and setting up of the remote control 200 may be accomplished directly or via a computer. In one embodiment, directly programming the remote control 200 includes the user physically interacting with the remote control 200, whereas indirectly programming the remote control 200 includes the user employing a keyboard, mouse, or some other I/O device to operate the computer, which in turn transfers data to the remote control 200. The setup or configuration software is preferably in the form of a program that guides the user through setup options, enabling the user to selectively indicate the portions of the setup that are desired. As noted, one setup option preferably includes the ability to assign channels to icons, or vice-versa. The modified remote data is transferable to the remote control 200 via the docking station 106 (FIG. 1). Once transferred to the remote, the data is stored in at least one of the memories 120, 122 (FIG. 2).

Referring back to FIG. 6A, one embodiment of the invention provides that the "Wizard" and "Setup" menu items 206 are used, for example, to setup or program the remote control 200 to control desired media devices, setup an association between icons and media device channel numbers, and identify selected media device providers (e.g., TV, cable, satellite, etc.). The "Wizard" and "Setup" menu items 206 are similar, yet different in that the "Wizard" menu item 206 provides successive screens which lead the user through an initial setup process, whereas the "Setup" menu item 206 provides similar setup screens, but allows the user more leeway to selectively setup the remote control 200.

Figure 7A:
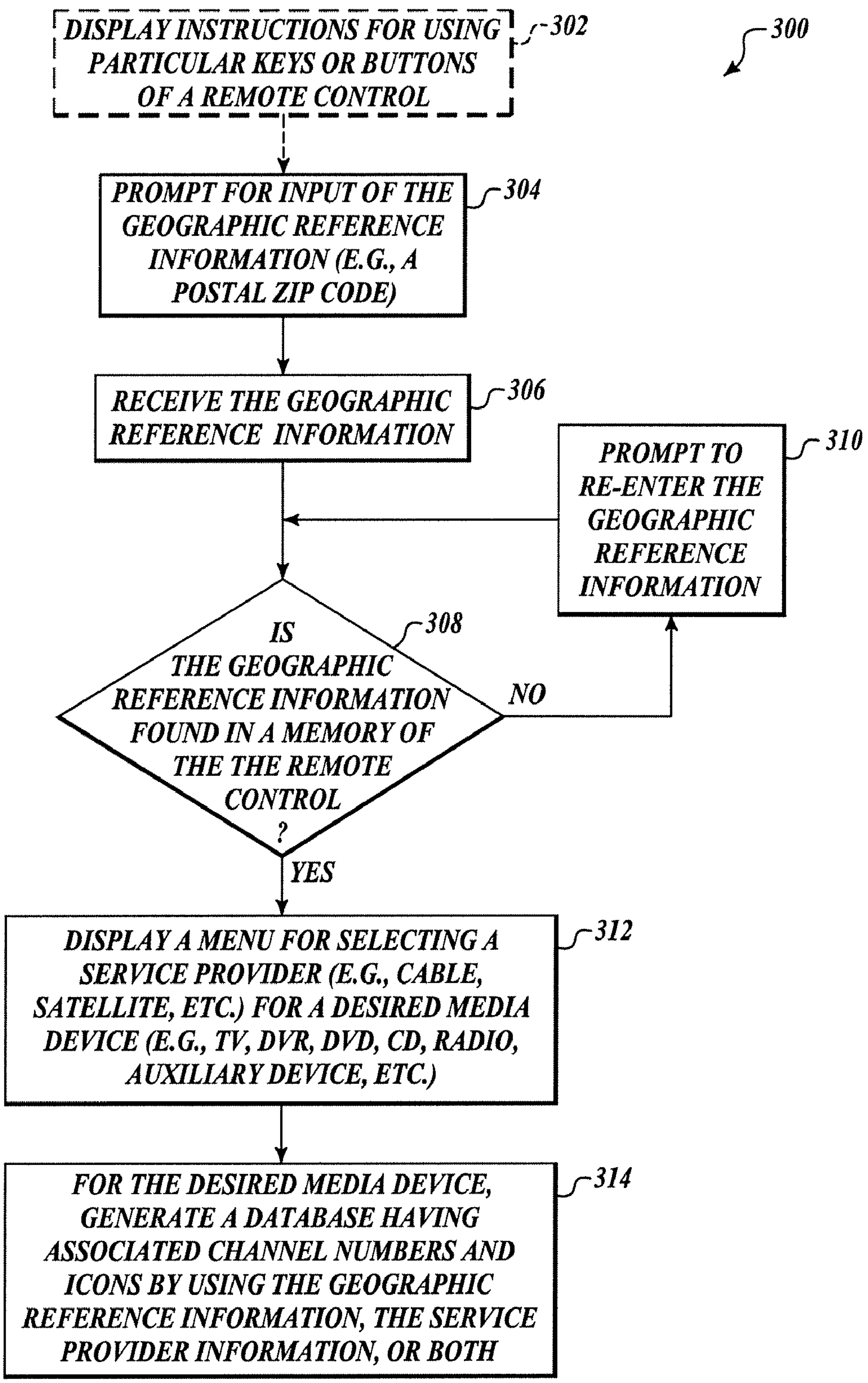
FIG. 7A is a flowchart showing a method of setting up a remote control, to include inputting geographic reference information, according to one illustrated embodiment.
Figure 7B:
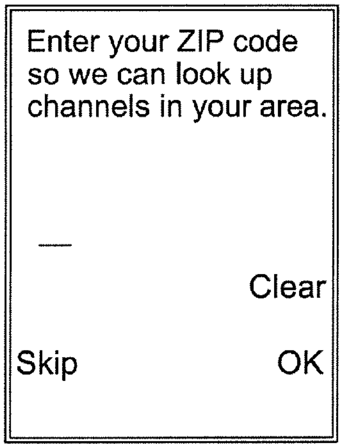
FIGS. 7B-7G show a top plan view of a display screen of a remote control with menus for proceeding through the method provided in FIG. 7A.
Figure 7C:
Figure 7D:
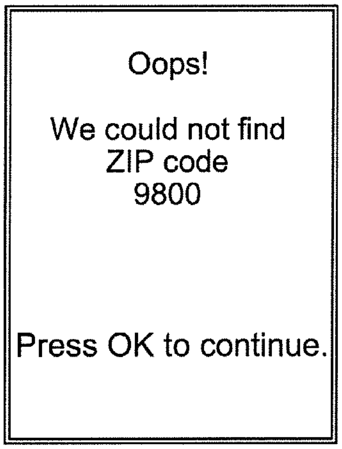
Figure 7E:

FIG. 7A shows a method 300 for setting up a remote control. The method 300 may be accomplished through direct or indirect (i.e., via a computer) interaction with the remote control. For purposes of the present description, the method 300 is accomplished through direct interaction with the remote control after the remote control has been initially purchased or is to be used by a new user. Optionally and initially, to help orient the user with the remote control, block 302 provides that the remote control displays instructions for using particular keys or buttons.

At block 304, the remote control provides a display requesting that certain geographic reference information, such as a postal zip code, area code, or some other geographic designator, be input into the remote control. One purpose for requesting this geographic reference information is to allow the remote control to automatically identify and associate channel icons with channel numbers or to automatically provide at least one media provider within the user's geographic region. At block 306, the geographic reference information is received by the remote control. At block 308, the memory of the remote control is scanned or searched to determine if matching geographic reference information is stored in the remote control. One purpose for block 308 is to make sure that the geographic reference information was entered properly, which means that inputting a four number zip code instead of five numbers would prompt a message to re-enter the geographic reference information as provided in block 310 and sequentially illustrated in FIGS. 7B-7E.

Figure 7F:
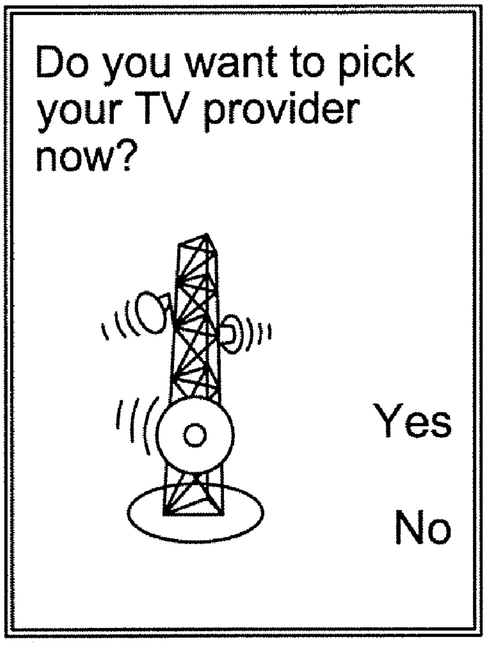
Figure 7G:
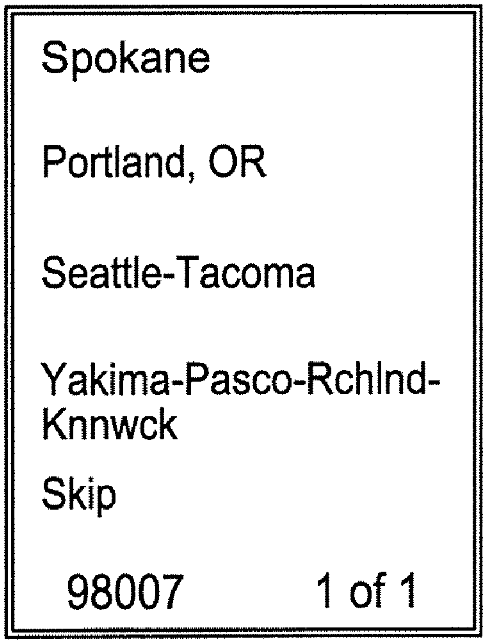

At block 312, the remote control uses the geographic reference information to generate a menu or list of service providers, which are then displayed on the display screen of the remote control. One example of this process is shown in FIGS. 7F and 7G where the remote control prompts the user to select a television service provider that broadcasts in the geographic region that corresponds to the entered zip code. At block 314, the remote control utilizes the geographic reference information to generate a database in which media device channel numbers are paired or associated with channel icons. By way of example, the remote control constructs a database associating channel icons with local media device channel numbers (e.g., Channel 4—ABC®; Channel 5—NBC®; Channel 30—FOX®, etc.).

This form of building an icon association database is based on a memory within the remote control that contains databases for a plurality of geographic regions, including the region associated with the entered zip code. If the memory size is sufficient, this form may be preferred. Alternatively, the channel and icon database is retrieved remotely. The remote retrieval option may be preferable because it requires less memory capacity in the remote control and can allow the system to be easily updated for new channels and changed channel numbers. In this form, the remote control preferably obtains the channel and icon database from a remote server that is accessed via the computer in communication with the remote control.

Figure 8A:
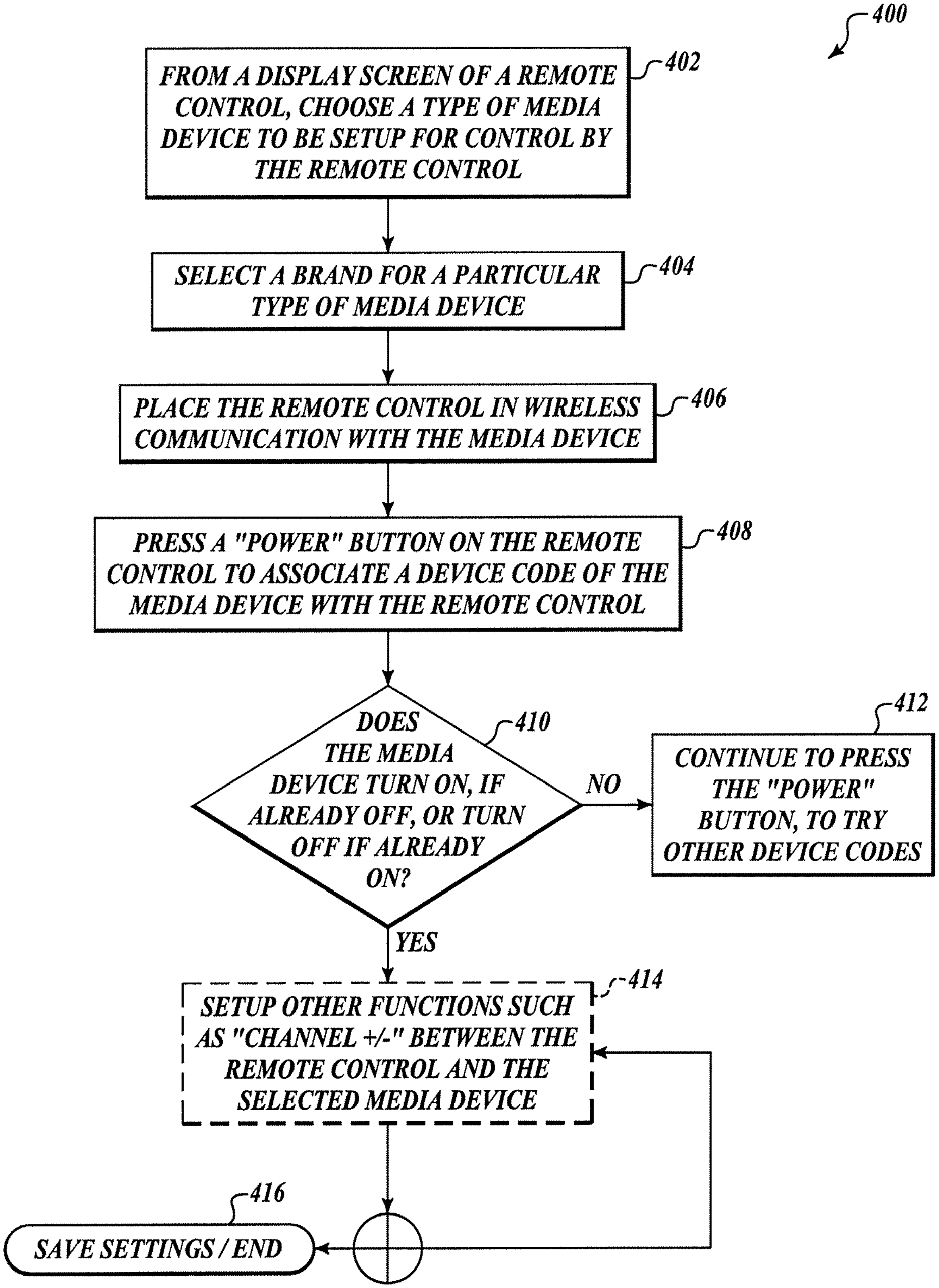
FIG. 8A is a flowchart showing a method of setting up a media device to be controlled by a remote control according to one illustrated embodiment.
Figure 8B:
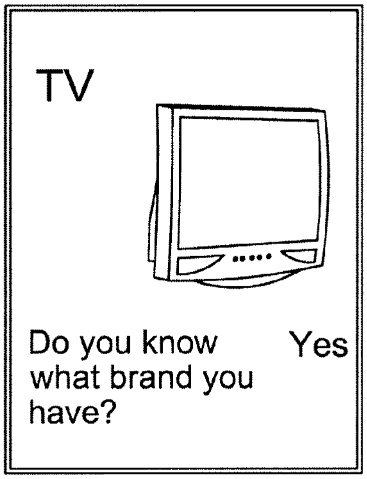
FIGS. 8B-8E show a top plan view of a display screen of a remote control with menus for proceeding through the method provided in FIG. 8A.
Figure 8C:

FIG. 8A shows a method 400 of setting up the remote control to control a desired media device. At block 402, a display screen of the remote control permits a user to choose a type of media device to be setup for control by the remote control. At block 404, a list of brand names for the type of media device is presented for the user to select one of the brand names, if known. In other instances, additional information may be needed to identify the media device such as a model number, serial number, etc. If the brand name is not known, the user may optionally select a "try all" function on the remote control, which allows the remote control to cycle through a number of available device or setup codes in an attempt to find the code that matches the chosen type of media device. If the brand is known, the user selects that brand by pressing a corresponding peripheral button 204 according to one embodiment. FIGS. 8B and 8C provide exemplary illustrations of the display screens of the remote control in accordance with the processes described in blocks 402 and 404, respectively.

Figure 8D:
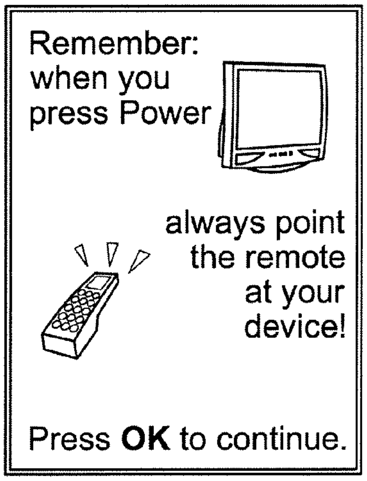
Figure 8E:
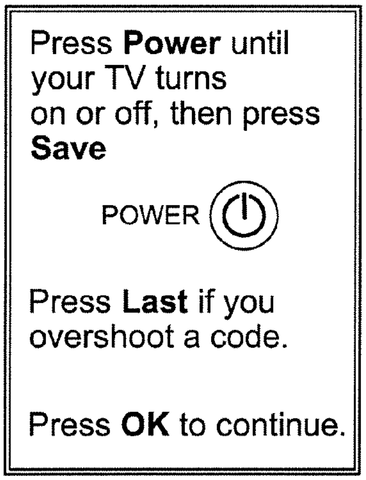

At block 406, the remote control is placed in wireless communication with the media device that is to be controlled. At block 408, the "Power" button on the remote control is pressed and released in an attempt to associate a setup or device code of the media device with the remote control, or vice-versa. At block 410, the user determines whether pressing the "Power" button turned the media device either ON or OFF, depending on its initial state. If pressing the "Power" button had no effect on the media device, then at block 412 the user continues to press the "Power" button, which results in the remote control testing other device codes that may be stored in a device code library in the remote control. If pressing the "Power" button does change the state of the media device, then at block 414 the user has the option of setting up other functions such as the "Channel +/−" function, which permits the remote control to successively step up or down through the channels of the media device. At any time during the setup method 400, the user may save settings or end the setup process as shown at block 416. Saving the setup configuration of the remote control allows the remote control to be subsequently used to control the setup features of the media device without going through additional or similar setup steps. After a first media device has been setup to be controlled by the remote control, the method 400 may be repeated for other media devices such as a cable box, DVR, DVD, CD, etc. FIGS. 8D through 8E provide exemplary illustrations of the display screen of the remote control for at least some of the above-described processes for method 400.

Figure 9:
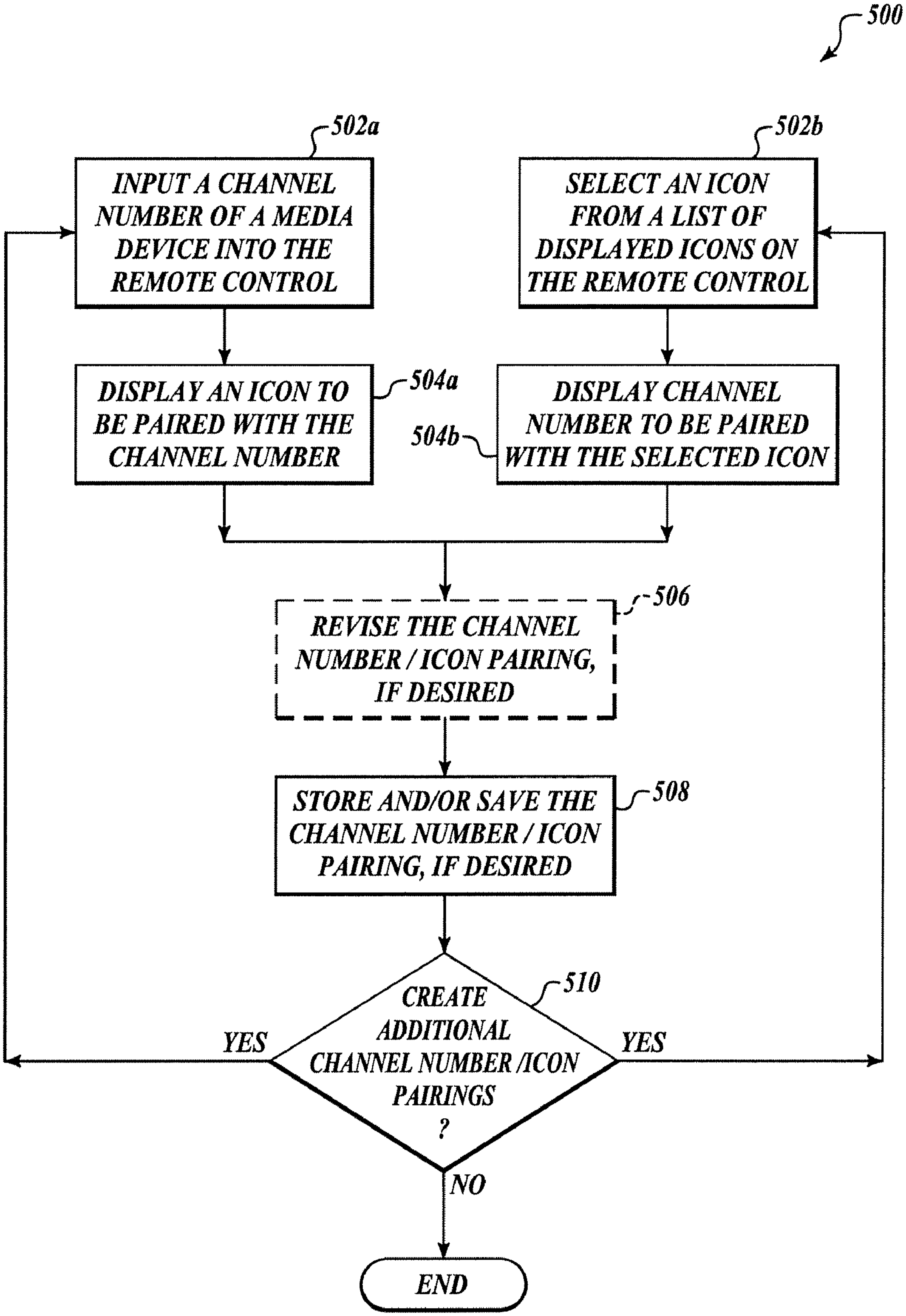
FIG. 9 is a flowchart showing similar, but slightly different methods for arranging channel number and icon pairings in a remote control.

FIG. 9 shows a method 500 of associating channel numbers with icons in the remote control, or vice-versa. In one example of the invention, the remote is initially programmed with icons stored in a memory, but without channel assignments or other macro routines associated with those icons. A disk or other memory device accompanying the remote includes software operable by a microprocessor in order to tailor the remote in a manner desired by a particular user, for example by assigning channels to the icons. Thus, icons and channel assignment data may be preprogrammed into the remote, stored on a memory device such as a disk accompanying the remote, or accessed over a network.

For brevity, the processes of associating a channel number with an icon or associating an icon with a channel number are described alternatively and in parallel. At block 502*a*, a channel number of a media device is input into the remote control. In one embodiment, the channel number is input into the remote control using the numeric keypad 210 (FIG. 4A). At block 504*a*, an icon is displayed in response to the input channel number. As previously described, the icon may be automatically selected from a database of icons in accordance with the geographic reference information that was input into the remote control during method 300 above. For example, the remote control is capable of automatically associating channel "4" in a certain geographic region with the ABC® icon.

As an alternative to the above-described process, the icon may be selected first and then automatically paired with a channel number. Hence, at block 502*b*, the icon is selected from a list of icons presented on the display screen of the remote control—where the selection is done via one of the peripheral buttons 204. At block 504*b*, the channel number that is to be paired with the icon is displayed on the display screen. Again, the pairing of the channel number with the icon may depend on the geographic reference information (e.g., zip code) previously received by the remote control.

At block 506, the remote control provides an option for the user to revise or edit the channel number/icon pairing, if so desired. Thus, the user retains the option of associating or customizing the pairing, for example the user can assign a different icon with the channel number "4." In one embodiment, the icons are custom-made icons that are not similar to the "official" or trademarked channel brand icons, some of which were illustrated above. Revising or editing the pairing may include assigning a different channel number to a particular icon or vice-versa. At block 508, the pairing is saved or otherwise stored in the remote control. At block 510, the remote control prompts the user to create additional pairings or end this setup feature.

Figure 10:
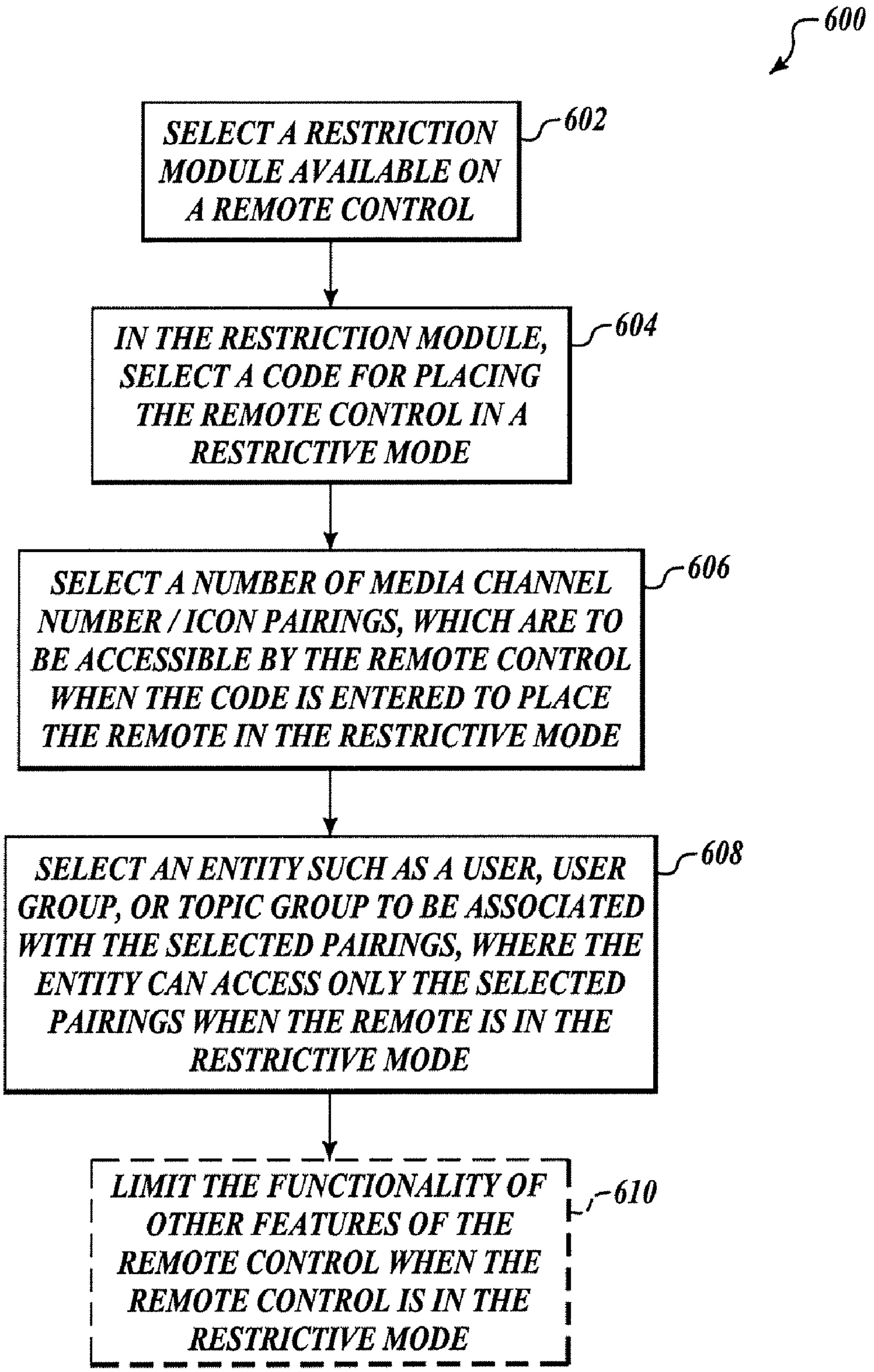
FIG. 10 is a flowchart showing a method of setting up a protection or restriction feature on a remote control.

FIG. 10 shows a method 600 of setting up a protection or restriction feature, such as the "KidSafe" menu item 206 referred to in FIG. 6A according to one embodiment. At block 602, a menu item that indicates the restriction feature, menu, or module is displayed on and then selected from the display screen of the remote control using the peripheral buttons or an equivalent means. At block 604, the user enters a security code, password, or some other machine-readable data to trigger the remote control to move into a restrictive mode. The restrictive feature, when activated using the code or password, may limit or restrict certain features of the remote control such as restricting access to certain media channels, limiting how much the volume may be increased, etc. In one embodiment, the code or password is entered into the remote control using the numeric keypad 210 (FIG. 4A). At block 606, restricting access to certain media channels includes identifying a number of media channel numbers/icon pairings and selecting a number of desired pairings that will be accessible by the remote control when in the restrictive mode. At block 608, the desired pairings are matched or associated with a particular user, user group, or topical group as previously discussed above and shown in FIG. 6A. For example, the restrictive mode may be activated to limit usage by one or more children in a household when the parents are not present to supervise the children's choice of television shows. Thus by selecting the user group "Kids" shown as one of the menu items in FIG. 6B, submenus may be displayed providing the name of each child in the household—hence the remote control may be customized based on the age or gender of each child. In addition to the aforementioned aspects, each user may have their own code or password that when entered into the remote control causes the remote control to assume that user's customized setup and prevent others from modifying the setup. In such an embodiment, one user may have an administrator or owner password that may be used to override all other configurations or setup aspects of the remote control. At block 610, the user may optionally setup the remote control to be restricted or limited with regard to other features, for example the maximum volume may be limited when a particular user is using the remote control.

In another embodiment of the invention, the remote control 200 may be setup to have a universal ON/OFF feature, such as the "QuickPower" menu item referred to in FIG. 6A according to one embodiment. In one aspect, the universal power feature operates to simultaneously turn on/off multiple media devices (e.g., TV, VCR, cable, etc.)—at least those media devices that have been setup to be controlled by the remote control 200. The devices that have not been setup to be controlled by the remote control 200 may be displayed in an under-intensified, light gray, or other similar type of font on the display screen 202.

Figure 11:
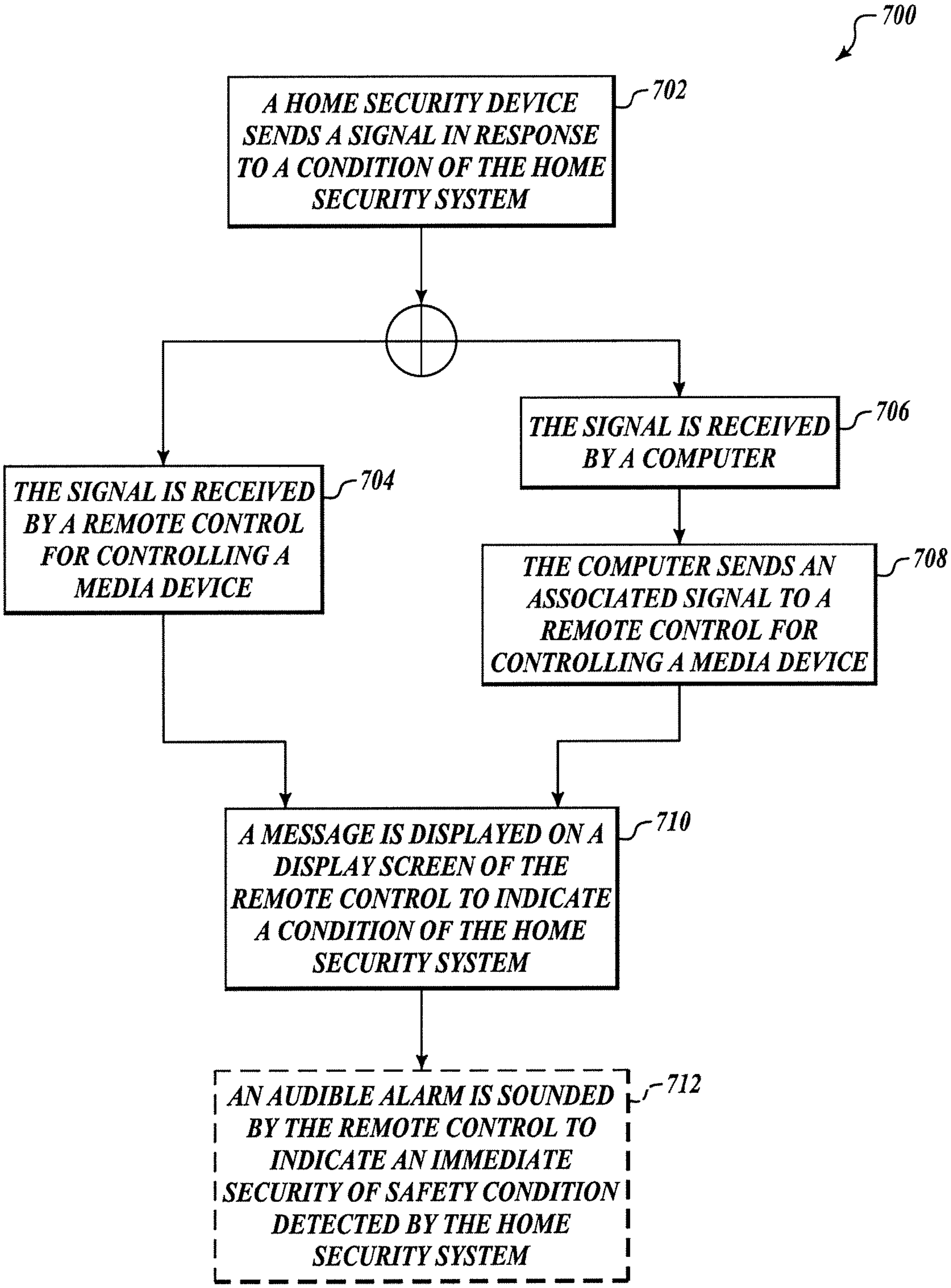
FIG. 11 is a flowchart showing a method where a remote control is communicates with a home security system

In yet another embodiment of the invention, FIG. 11 shows an exemplary method 700 where the remote control 200 is capable of communicating with a home security system. The home security system is configured to be controlled by the remote just like other devices (e.g., TV, VCR, etc.). The remote sends commands such as Arm, Disarm, etc. for the home security system instead of sending commands like On, Off, Channel Up, Volume down for a TV, or Play, Stop, Record for a VCR or DVD.

The remote control 200 includes a transceiver (e.g., 310 MHz, 433 MHz) to send or receive signals from various devices of the home security system directly or via the computer 102. At block 702, a home security device of the home security system transmits a signal in response to a condition of the home security system. The signal is received by either the remote control directly as shown in block 704 or by a computer as shown in block 706. If the latter, then block 708 indicates that the computer transmit an associated signal to the remote control. In one example of the invention, the computer 102 receives modulated radio frequency (RF) signals from a sensor of the home security system, such as an optical sensor—specifically a wireless motion sensor coupled to a door or window. In another example, the computer 102 receives electromagnetic modulated signals from a smoke alarm system of the home security system. This format may be preferable because a home personal computer may already be set up to control and monitor signals from a variety of home security devices.

After the remote control 200 receives the signal either directly from the home security device or from the personal computer, at block 710 the remote control displays a message or a security status indicator on the display screen 202, which may indicate a condition of the home security system (e.g., that a particular window or door is open). The status indicator may be in the form of a textual message, an iconic representation, or a combination of both. Optionally at block 712, the remote control 200 may be programmed to activate an audible alarm or other sound to indicate that one of the home security sensors has detected some sort of activity or condition that may have immediate security or safety implications.

Figure 12:
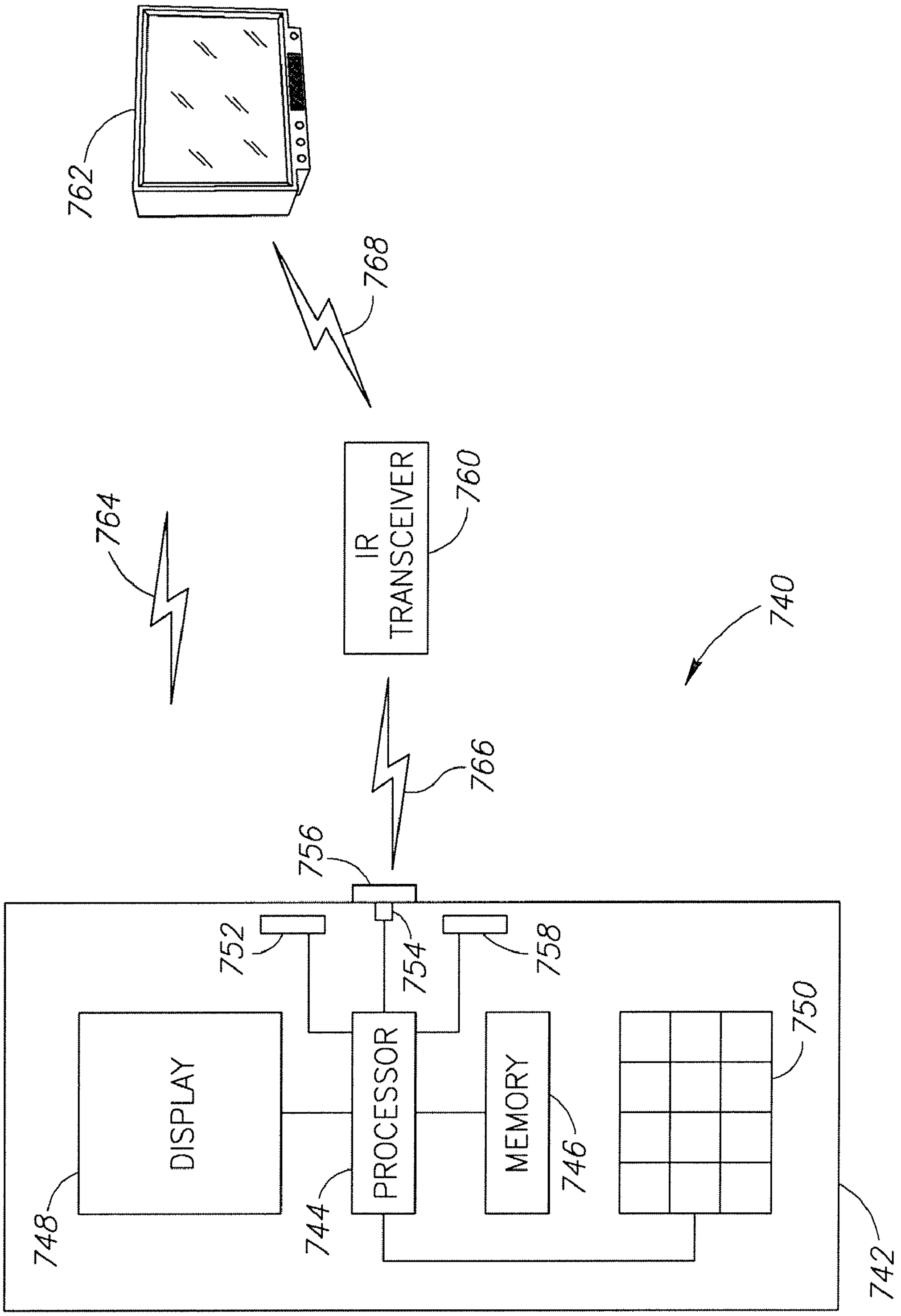
FIG. 12 is a block diagram of a mobile phone remote control system in accordance with an embodiment of the invention.

FIG. 12 is a block diagram of a mobile phone remote control system 740 in accordance with an additional embodiment of the invention. The system 740 includes a mobile phone 742 configured to operate over a cellular network (not shown) using a technology such as D-AMPS, CDMA2000, GSM, GPRS, EV-DO, or UMTS for example. The mobile phone 742 includes a microprocessor 744 in data communication with a memory 746 as well as a display 748 and an interface 750 for receiving input from a user, both the display 748 and the interface 750 being in signal communication with the microprocessor 744. The interface 750 includes a plurality of buttons in an embodiment. In other embodiments, the interface 750 is implemented using a touch screen. The mobile phone 742 also includes a software module (not shown) for storage in the memory 746 and operable by the processor 744 for generating images for presentation on the display 748 and responding to user input through the interface 750. In an embodiment, the software module includes a user interface component that may be updated over the cellular network.

In an example embodiment, the mobile phone 742 also includes an infrared (IR) transmitter 752 in signal communication with the processor 744. When such a transmitter is present, the mobile phone will be configured to communicate directly with an electronic device such as a television that is controllable via an IR remote in the manner as discussed above. However, the IR transmitter 752 is not present in all embodiments. Optionally, the mobile phone 742 includes a port 754 in signal communication with the processor 744. In an example embodiment, an add-on IR transmitter 756 is connected to the port 754 and is controlled by the processor 744. Optionally, the mobile phone 742 includes an additional radio frequency (RF) transmitter 758 in signal communication with the processor 744. In some embodiments, the RF transmitter 758 is a transceiver. As an example, the RF transmitter 758 transmits signals with a frequency and protocol commonly designated as Bluetooth in some embodiments. As an additional example, the RF transmitter 758 transmits signals with a frequency and protocol specified with an IEEE 802.11 standard in other embodiments. In some embodiments that make use of the RF transmitter 758, the system 740 also includes an IR transceiver 760. The IR transceiver 760 converts RF signals to IR signals that are understood by the electronic device to be controlled. For example, the IR transceiver converts Bluetooth signals to IR signals in one embodiment and 802.11 signals to IR signals in other embodiments. It should also be understood that the IR transceiver or transmitter may be an RF transceiver or transmitter configured to wirelessly control electronic devices constructed to receive RF commands.

The mobile phone 742 includes a number of components in some embodiments that are not shown for clarity. For example, the mobile phone includes one or more antennas in some embodiments. The mobile phone 742 also includes transmission, receiving, and/or transceiver components for communication over one or more types of cellular networks. Additionally, the details of some components of the mobile phone 742 are not shown for clarity. For example, the memory 746 may include volatile memory, non-volatile memory, and/or removable memory, including but not limited to the types of memory described with reference to FIG. 2. The mobile phone 742 is also in data communication with a server (not shown) over the cellular network in some embodiments. In other embodiments, the mobile phone 742 is configured to allow connection to a personal computer (PC) (not shown) through a wired connection, wireless connection, or docking station, for example. The mobile phone 742 stores one or more IR codes (not shown) in the memory 746 in some embodiments, and stores a library of IR codes corresponding to numeric input for channel selection and other input such as an enter or return button press for one or more media devices. In general, when configured to serve as a remote, the mobile phone is configured to store much or all of the data, commands, icons, and programs as described above with respect to the remote control embodiments.

The system 740 is configured to control a media device 762 such as a television (TV), for example. Other media devices 762, such as those described with reference to other embodiments may also be controlled. The display 748 is configured to display an icon, such as the trademarked logos previously described and those described with reference to FIG. 5B. A screen interface driven by the software module and responsive to the user interface 750 allows selection of an icon that causes the processor 744 to operate programming instructions that activate a transmitter controlled by the processor 744 to transmit a wireless signal from the mobile phone 742, the signal containing information to change the channel of the media device 762 to a channel represented by the selected icon. In some embodiments, the transmitted wireless signal is an IR signal 764 that is transmitted directly to the media device 762 from the IR transmitter 752 or the add-on IR transmitter 756. In other embodiments, the transmitted wireless signal is an RF signal 766 transmitted from the RF transmitter 758 that is received by the IR transceiver 760 for conversion to an IR signal 768 that is transmitted to the media device 762. As described above with respect to the RF transmitter 758, the RF signal 766 is a Bluetooth signal in an example embodiment and an 802.11 signal in an additional example embodiment.

Figure 13:
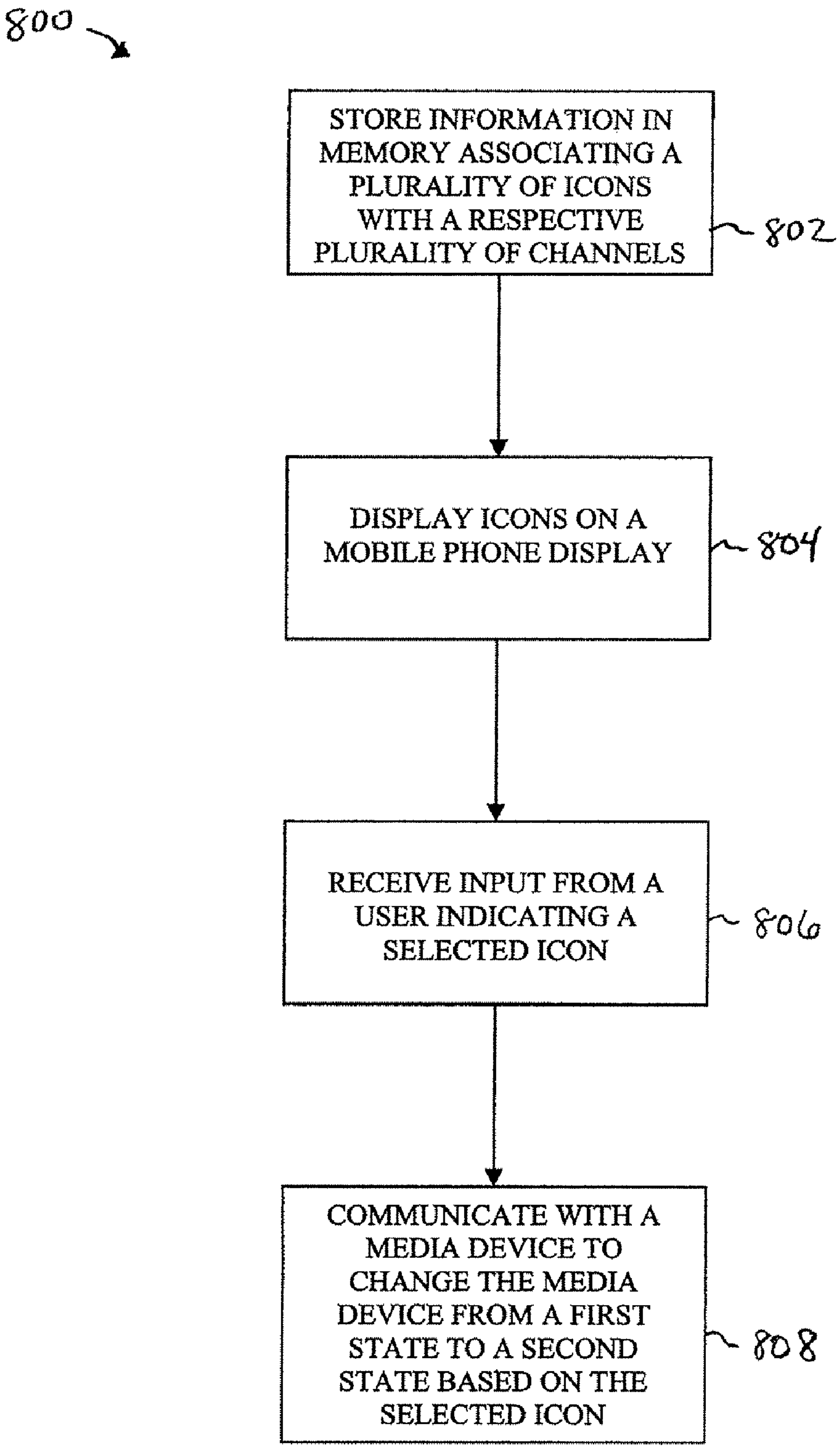
FIG. 13 is a flowchart showing a method of using a mobile phone configured to operate as a remote control.

FIG. 13 is a flowchart showing a method 800 of using a mobile phone configured to operate as a remote control in accordance with an embodiment of the invention. In an example embodiment, the mobile phone is similar to the mobile phone 742, including the processor 744, the memory 746, the display 748, and the user interface 750 described with reference to FIG. 12. First, at a block 802, information is stored in the memory 746 associating a plurality of icons with a respective plurality of channels. In an example embodiment, storing information includes downloading information over a network based on previously identified geographic information associated with a user of the mobile phone. The geographic information includes a zip code associated with the user account in an example embodiment. In an additional embodiment, the geographic information includes geographic information derived from a telephone number assigned to the user. In an additional embodiment, the geographic information may be entered directly by the user, such as by entering a zip code of an area they are visiting such as the zip code of a vacation home that is in a different geographic location than the user's billing or user address.

Next, at a block 804, icons are displayed on the display 748. In some embodiments, displaying icons includes displaying icons representative of selected media device channels and/or displaying television channels. Then, at a block 806, input is received from a user through the user interface 750 indicating that an icon has been selected. In an embodiment, receiving input includes receiving information indicating that a button located on the mobile phone has been depressed by the user. Next, at a block 808, communication signals are sent to a media device such as the media device 762 to change the media device 762 from a first state to a second state based on the selected icon. In an embodiment, communicating with the media device 762 to change the media device 762 from the first state to the second state includes changing a channel of the media device from a first channel to a second channel.

Figure 14:
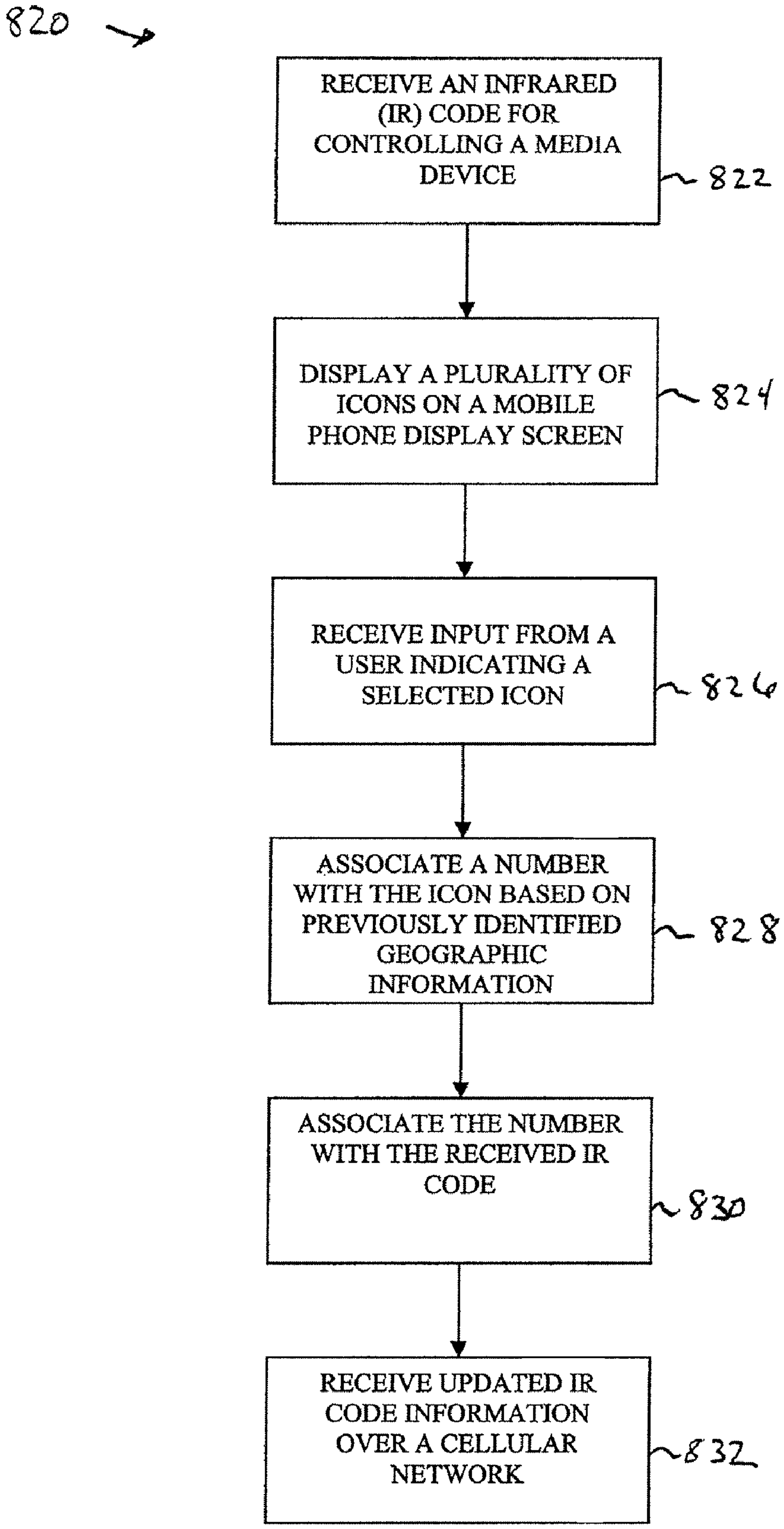
FIG. 14 is a flowchart showing a method of configuring a mobile phone configured to operate as a remote control for use with a media device.

FIG. 14 is a flowchart showing a method 820 of configuring a mobile phone configured to operate as a remote control for use with a media device in accordance with an embodiment of the invention. In an example embodiment, the mobile phone is similar to the mobile phone 742, including the processor 744, the memory 746, the display 748, and the user interface 750 described with reference to FIG. 12. First, at a block 822, an infrared (IR) code for controlling a media device such as the media device 762 is received. In an example embodiment, the IR code is received over a cellular network and stored in the memory 746. Rather than individual IR codes, a library of IR codes is stored in some embodiments with information corresponding to compatible media devices 762 for codes contained in the library so that they may be properly accessed by the processor 744. In other embodiments, the IR code is downloaded over the cellular network as needed without storage in the memory 746. In still other embodiments, the IR code may be downloaded from a personal computer in signal communication with the mobile phone 742 or learned directly from a remote associated with the media device 762, such as by pressing buttons on the remote to cause particular IR codes to be transmitted, which are then learned by the system 740 by receiving the IR codes at an IR receiver (not shown) and storing the codes in the memory 746.

Next, at a block 824, a plurality of icons are displayed on the mobile phone 742 display 748. Then, at a block 826, input is received from a user indicating a selected icon. In some embodiment, additional input is received from the user indicating a television provider associated with the media device 762, such as a particular cable or satellite TV provider. Next, at a block 828, a number is associated with the icon based on previously identified geographic information. In embodiments where additional information identifying a television provider had been entered, the association of the number with the icon is also based on the entered television provider. Then, at a block 230, the number is associated with the received IR code. Next, at a block 832, updated IR code information is received over a cellular network in some embodiments. The updated IR code information updates the entire library of IR codes in some embodiments, and only a portion of the library or a single IR code as needed in other embodiments.

When configured in accordance with the embodiment discussed above, the mobile phone example is able to serve as a remote control in the manner described above with respect to the icon remote control embodiments. All of the above features may be programmed into the mobile phone in a manner similar to that for the remote control, thereby allowing the mobile phone to display icons and allow a television or other device to be controlled through the selection of icons or other indicators presented on the mobile phone screen.

Many other changes can be made in light of the above detailed description. In general, in the following claims, the terms used should not be construed to limit the invention to the specific embodiments disclosed in the specification and the claims, but should be construed to include all types of remote controls, computers, and data communication means that operate in accordance with the claims. Accordingly, the invention is not limited by the disclosure, but instead its scope is to be determined entirely by the following claims.

What is claimed is:

1. A mobile phone remote control system comprising:

a mobile phone including:

a microprocessor;

a memory accessible by the microprocessor;

a setup module configured to set up, based on a geographic region derived from a telephone number assigned to a user of the mobile phone the mobile phone to operate as a remote control by automatically associating each of a plurality of icons with a respective television channel provided by a television provider within the geographic region;

a display screen configured to display an icon of the plurality of icons, the icon corresponding to a channel of a media device and selected from a database of icons stored in the memory; and a screen interface that allows a selection of the icon, wherein the selection of the icon causes the microprocessor to operate programming instructions stored in the memory; and a transmitter controlled by the microprocessor to transmit a wireless signal from the mobile phone in response to the operation of the stored programming instructions, the signal containing information to change the channel of the media device to the channel represented by the selected icon.

2. The mobile phone remote control system of claim 1, wherein the transmitter is an infrared (IR) transmitter included as a part of the mobile phone.

3. The mobile phone remote control system of claim 1, wherein the transmitter is an infrared (IR) transmitter that is not an integral part of the phone.

4. The mobile phone remote control system of claim 1, further comprising an infrared (IR) transceiver in signal communication with the transmitter.

5. The mobile phone remote control system of claim 4, wherein the transmitter transmits signals with a frequency and protocol commonly designated as Bluetooth and wherein the IR transceiver converts the Bluetooth signals to IR signals.

6. The mobile phone remote control system of claim 4, wherein the transmitter transmits signals with a frequency and protocol specified with an IEEE 802.11 standard and the IR transceiver converts the 802.11 signals to IR signals.

7. The mobile phone remote control system of claim 1, further comprising a library of universal IR codes accessible by the microprocessor.

8. The mobile phone remote control system of claim 7, wherein the library is stored in the memory.

9. The mobile phone remote control system of claim 7, wherein the library is stored on a chip that includes the microprocessor.

10. The mobile phone remote control system of claim7, wherein the library is stored on an additional component.

11. The mobile phone remote control system of claim7, wherein the library is stored on a server accessible over a network.

12. The mobile phone remote control system of claim 1, wherein the display screen is sized to display the plurality of icons.

13. The mobile phone remote control system of claim 1 wherein the memory includes stored information associating each of the plurality of icons with the respective television channel.

14. The mobile phone remote control system of claim 1, wherein the screen interface is configured to allow updating of the interface over a cellular network.

15. The mobile phone remote control system of claim 1, wherein the screen interface comprises a touch screen.

16. The mobile phone remote control system of claim 1, wherein the setup module is further configured to receive input from at least one interface of the mobile phone, the setup module digitally coupled with the display screen to permit a user to directly program a remote control aspect of the mobile phone.

17. The mobile phone remote control system of claim 1, further comprising stored programming instructions responsive to a user input and operable by a user to change a configuration a remote control aspect of the mobile phone from a first configuration associated with a first user to a second configuration associated with a second user.

18. A method of using a mobile phone remote control system the method comprising:

setting up, based on a geographic region derived from a telephone number assigned to a user of the mobile phone, the mobile phone to operate as a remote control by automatically associating each of a plurality of icons with a respective television channel provided by a television provider within the geographic region;

displaying the plurality of icons on a display screen of the mobile phone, the plurality of icons selected from a database of icons stored in a memory of the mobile phone;

receiving input from a user through a user interface of the mobile phone indicating a selected icon from the plurality of icons; and communicating with a media device to change the media device from a first state to a second state based on the selected icon.

19. The method of claim 18, wherein displaying the plurality of icons on the display screen includes displaying icons representative of selected media device channels.

20. The method of claim 19, wherein displaying icons includes displaying television channels.

21. The method of claim 18, further comprising storing information in the memory associating the plurality of icons with the respective plurality of channels.

22. The method of claim 21, wherein storing comprises downloading over a network based on previously identified geographic information associated with the user of the mobile phone.

23. The method of claim 21, wherein storing comprises downloading over a cellular network.

24. The method of claim 18, wherein receiving input from a user through the user interface includes receiving information indicating that a button located on the mobile phone has been depressed by the user.

25. The method of claim 19, wherein communicating with the media device to change the media device from the first state to the second state includes changing a channel of the media device from a first channel to a second channel.

26. A method of configuring a mobile phone remote control system for use with a media device, the method comprising:

setting up, based on a geographic region derived from a telephone number assigned to a user of the mobile phone, the mobile phone to operate as a remote control, by:

displaying a plurality of icons on a display screen of the mobile phone;

receiving input from a user through a user interface of the mobile phone indicating a selected icon from the plurality of icons; and automatically associating the selected icon with a television channel provided by a television provider within the geographic region.

27. The method of claim 26, further comprising receiving input from a user indicating the television provider, wherein associating the selected icon is also based on the indicated television provider.

28. The method of claim 26, further comprising:

receiving an infrared (IR) code for controlling the media device; and associating the number with the IR code.

29. The method of claim 28, wherein the IR code is downloaded over a cellular network.

30. The method of claim 28, wherein the IR code is downloaded from a personal computer.

31. The method of claim 28, wherein the IR code is stored in a memory of the mobile phone.

32. The method of claim 28, wherein the IR code is requested from a server over a cellular network as needed.

33. The method of claim 28, wherein the IR code is learned from a remote associated with the media device.

34. The method of claim 26, further comprising:

storing a library of infrared (IR) codes;

associating the number with a stored IR code; and updating the library over a cellular network.

35. A remote control system for a mobile phone that includes a microprocessor in communication with a memory, a display screen, and an interface, the system comprising:

an infrared (IR) transmitter that may be operatively coupled to the mobile phone such that the microprocessor can direct IR transmission; and a software module for storage in the memory and operable by the microprocessor that sets up, based on a geographic region derived from a telephone number assigned to a user of the mobile phone, the mobile phone to operate as a remote control by automatically associating each of a plurality of icons with a respective television channel provided by a television provider within the geographic region, displays an icon of the plurality of icons the icon corresponding to a channel of a media device on the display screen, receives input from a user selecting the icon through the interface, and activates the transmitter to transmit an IR signal based on the selected icon.

* * * * *